Aug. 27, 1929.   F. L. FULLER   1,725,859
CASH REGISTER
Original Filed May 23, 1919   7 Sheets-Sheet 1

Inventor
Frederick L. Fuller
By Pearl Beust
Henry E Stauffer
His Attorneys

Aug. 27, 1929.  F. L. FULLER  1,725,859
CASH REGISTER
Original Filed May 23, 1919  7 Sheets-Sheet 2
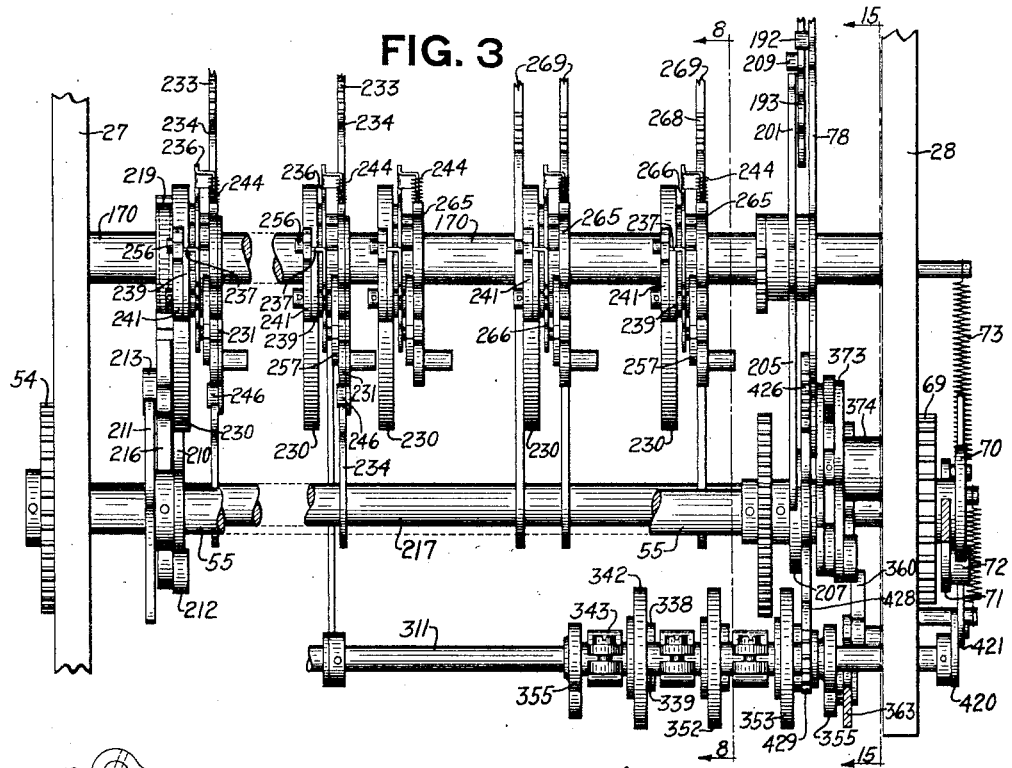
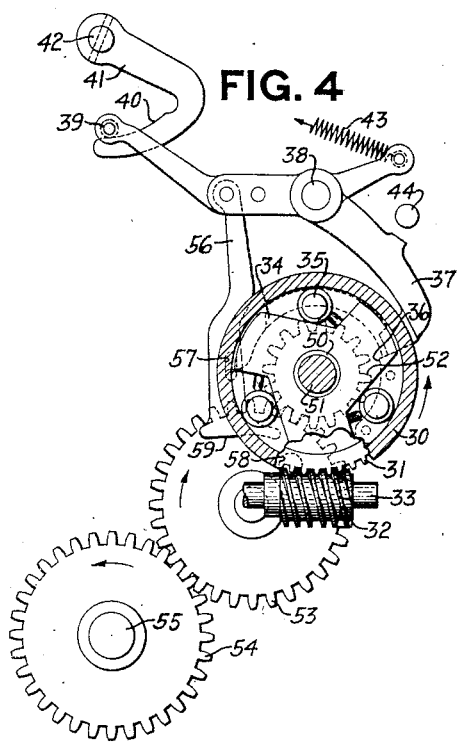
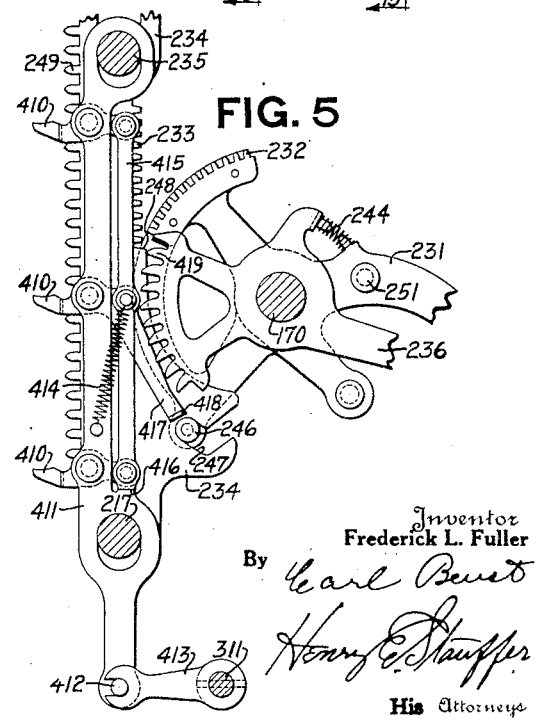
Inventor
Frederick L. Fuller
By Carl Beust
Henry E. Stauffer
His Attorneys Aug. 27, 1929.  F. L. FULLER  1,725,859
CASH REGISTER
Original Filed May 23, 1919  7 Sheets-Sheet 3
FIG. 6
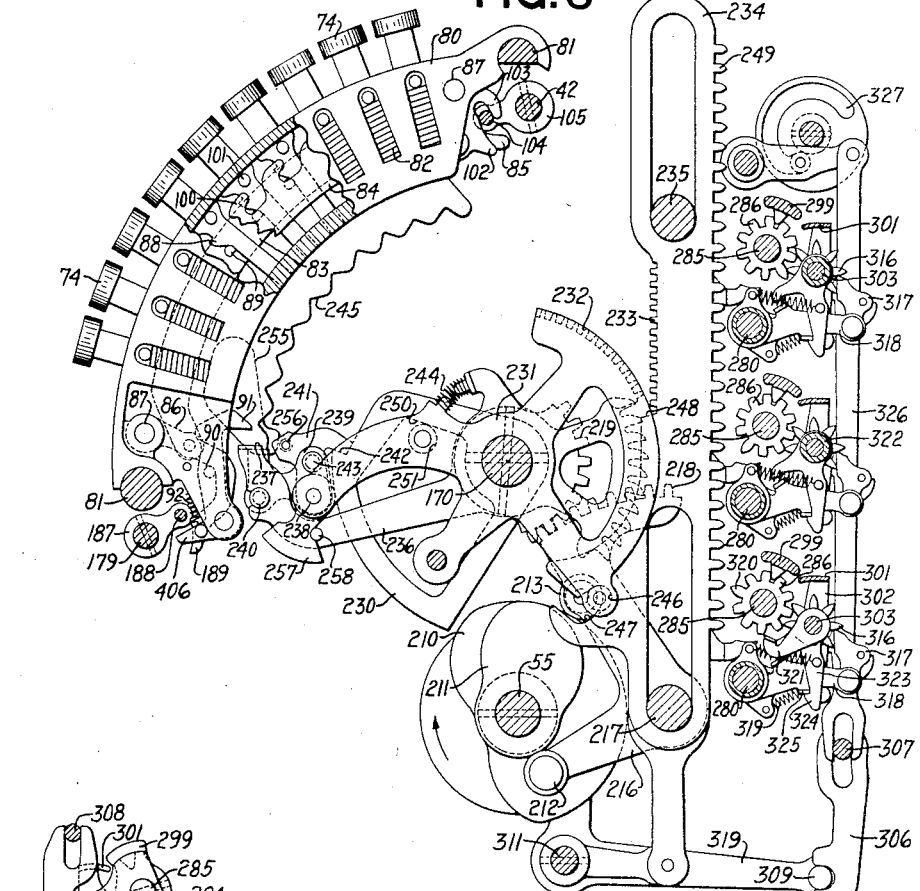
FIG. 7
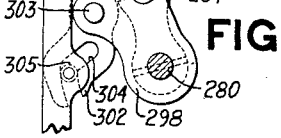
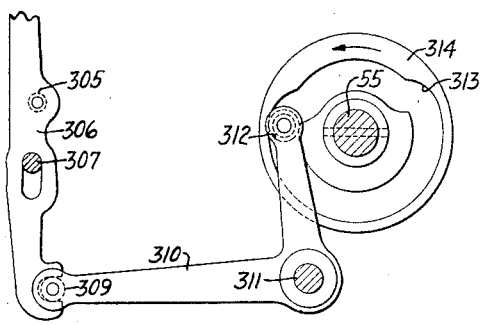
Inventor
Frederick L. Fuller
By Carl Beust
Henry E. Stauffer
His Attorneys Aug. 27, 1929.  F. L. FULLER  1,725,859
CASH REGISTER
Original Filed May 23, 1919   7 Sheets-Sheet 4
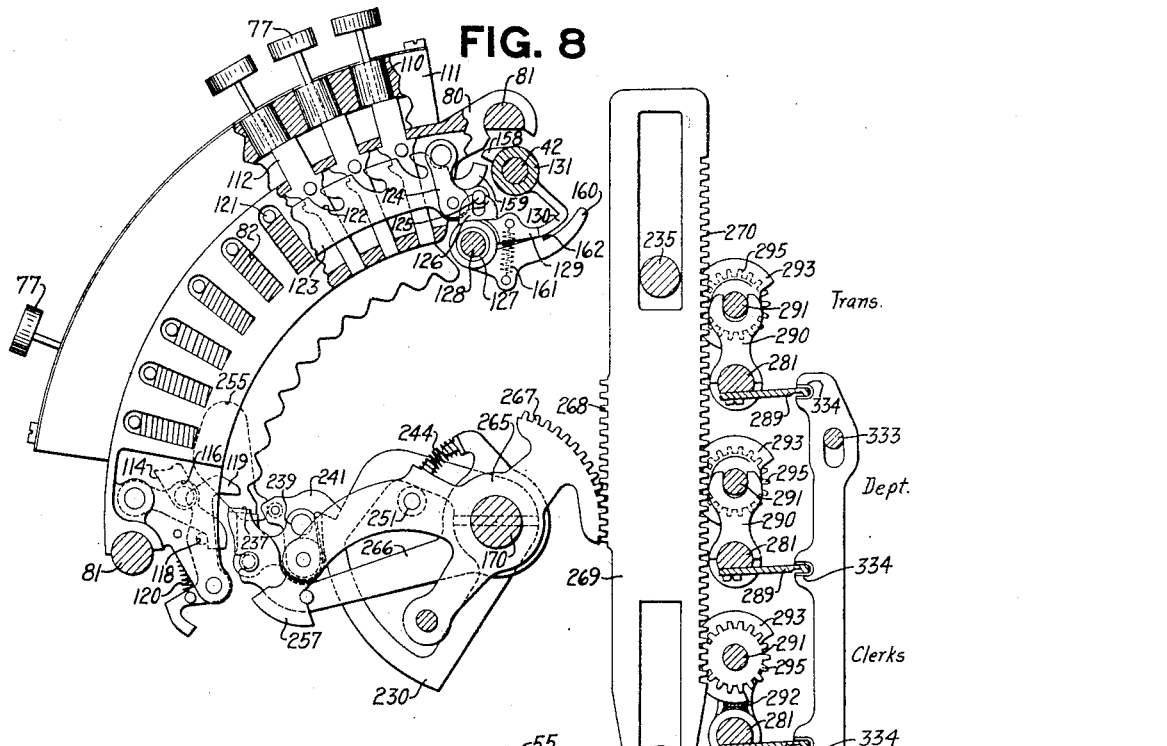
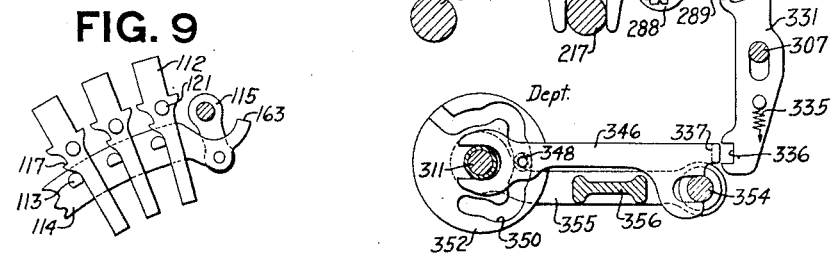
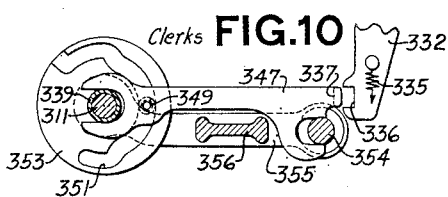
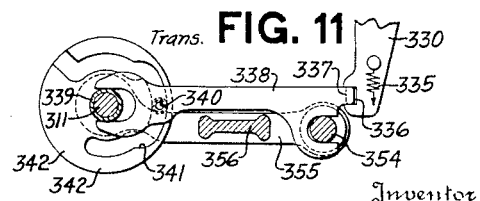
Inventor
Frederick L. Fuller
By
His Attorneys Aug. 27, 1929.    F. L. FULLER    1,725,859
CASH REGISTER
Original Filed May 23, 1919    7 Sheets-Sheet 5
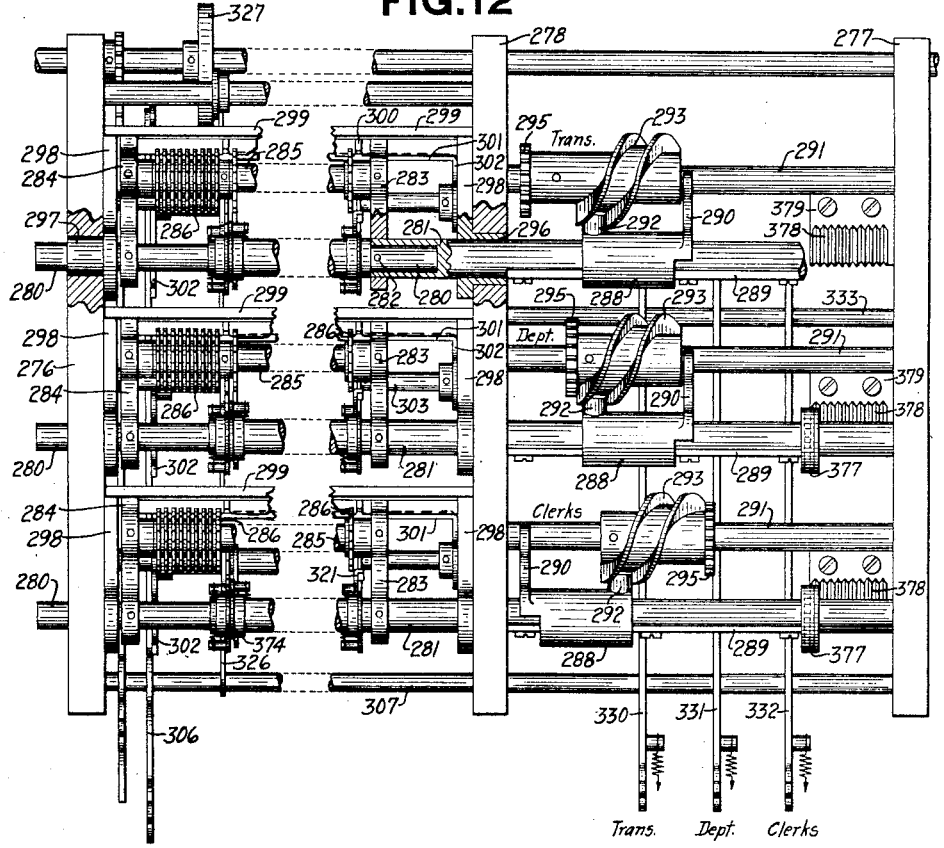
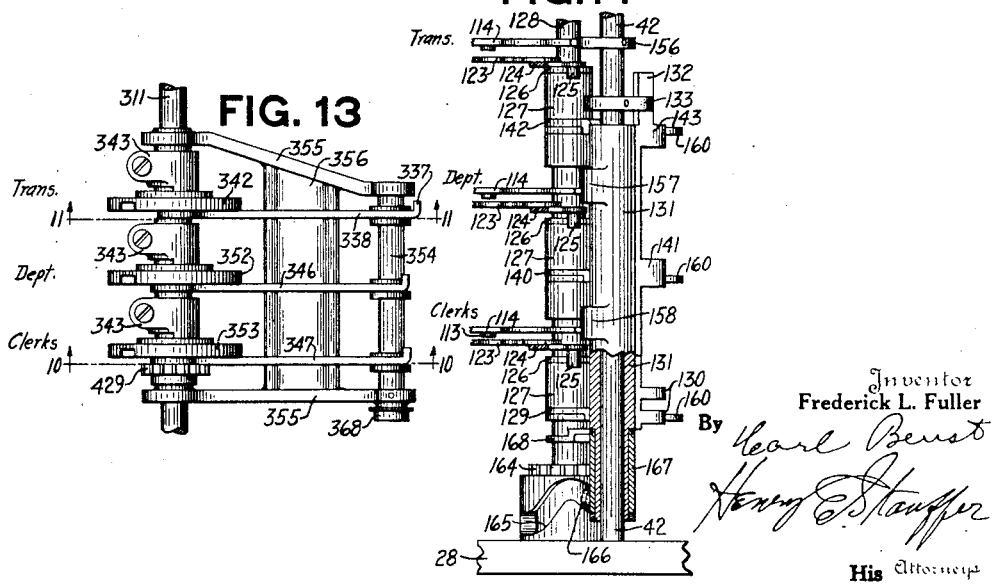

Aug. 27, 1929.   F. L. FULLER   1,725,859
CASH REGISTER
Original Filed May 23, 1919   7 Sheets-Sheet 6

Inventor
Frederick L. Fuller
By Carl Benst
Henry E. Stauffer
His Attorneys

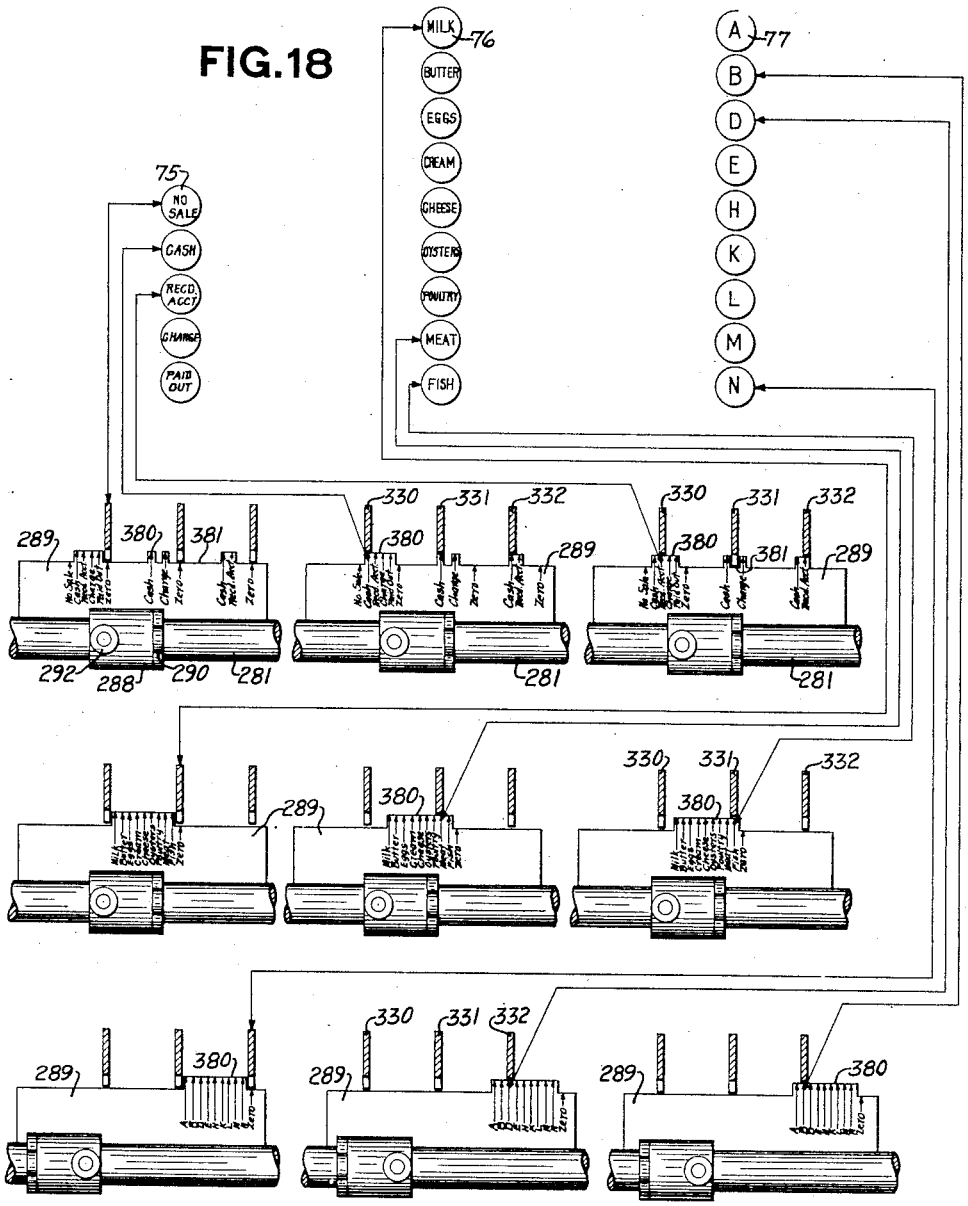
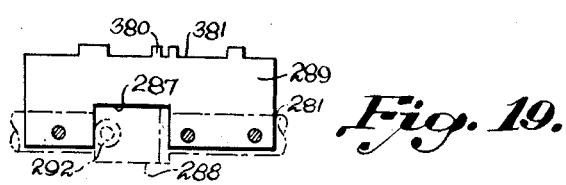

Patented Aug. 27, 1929.

1,725,859

UNITED STATES PATENT OFFICE.

FREDERICK L. FULLER, OF ILION, NEW YORK, ASSIGNOR TO THE NATIONAL CASH REGISTER COMPANY, OF DAYTON, OHIO, A CORPORATION OF MARYLAND.

CASH REGISTER.

Original application filed May 23, 1919, Serial No. 299,112. Divided and this application filed March 12, 1927. Serial No. 174,858.

This application is a division of the application for Letters Patent of the United States of Frederick L. Fuller, Serial No. 299,112, filed May 23, 1919.

The invention relates to improvements in cash registers and the like, the primary object of which is to devise a machine having a registering mechanism capable of performing a large variety of functions, thus rendering it adaptable for use in many different businesses, and at the same time to so construct the machine that it is relatively simple and durable.

The objects of the present improvements are to provide:

An improved form of oscillating differential mechanism for controlling reciprocating actuators for positioning the various totalizers commensurate with the keys depressed.

An improved form of accumulating mechanism including a plurality of individual totalizers arranged in groups, such totalizers being carried by a frame which is easily removable from the machine and its connection with the operating elements for the totalizers, thus rendering them accessible for repair and providing a simple and cheap assembly.

An improved mechanism for selecting various individual totalizers for actuation by the differential actuators and a novel mechanism co-operating with the selecting mechanism for controlling the engagement of the various totalizers with the actuators as determined by the manipulative devices.

A novel aligning mechanism for the differential actuators and individual totalizers and the totalizer lines.

For combining the total lever control for the machine with the totalizer selecting and engaging mechanism whereby such mechanisms are controlled jointly by the total lever and by the manipulative devices.

With these and incidental objects in view, the invention consists in certain novel features of construction and combinations of parts, the essential elements of which are set forth in the appended claims, and a preferred form or embodiment of which is hereinafter described, with reference to the drawings which accompany and form part of this specification.

Of said drawings:

Fig. 3 is a front elevation, parts being omitted and broken away, to more clearly show the differential mechanism and the main drive line.

Fig. 4 shows the connections from the driving motor to the main cam drive line.

Fig. 5 shows a differential unit and its connection with its associated totalizer actuating rack.

Fig. 6 is a section taken alongside of one of the amount banks of keys and looking toward the left, all indicating and printing mechanisms being omitted.

Fig. 7 is a detail of the cam and associated lever for actuating the totalizer aligning mechanism.

Fig. 8 is a section on line 8—8 of Fig. 3, looking in the direction of the arrows, and shows clerks' keys, the associated differential mechanism and the department totalizer engaging mechanism.

Fig. 9 is a fragmentary detail view of the flexible detent and clerks' keys stems.

Fig. 10 is a section on line 10—10 of Fig. 13, looking in the direction of the arrows, and shows the clerks' totalizer engaging mechanism.

Fig. 11 is a section on line 11—11 of Fig. 13, looking in the direction of the arrows, and shows the transaction totalizer engaging mechanism.

Fig. 12 is a front elevation, partially broken away, of the totalizers and their supporting frames, after their removal from the machine.

Fig. 13 is a top plan view of the totalizer selecting cams and pitmans for the transaction, department and clerks' keys.

Fig. 14 is a detail plan view, partly in section of the machine release mechanism.

Fig. 18 is a diagrammatic view of the totalizer selecting mechanism and its control by the keys in the transaction, department and clerks' banks.

Fig. 19 is a detailed view of one of the totalizer selecting and engaging bars, and shows the method of connecting the bar with the totalizer frame.

Figure 1:
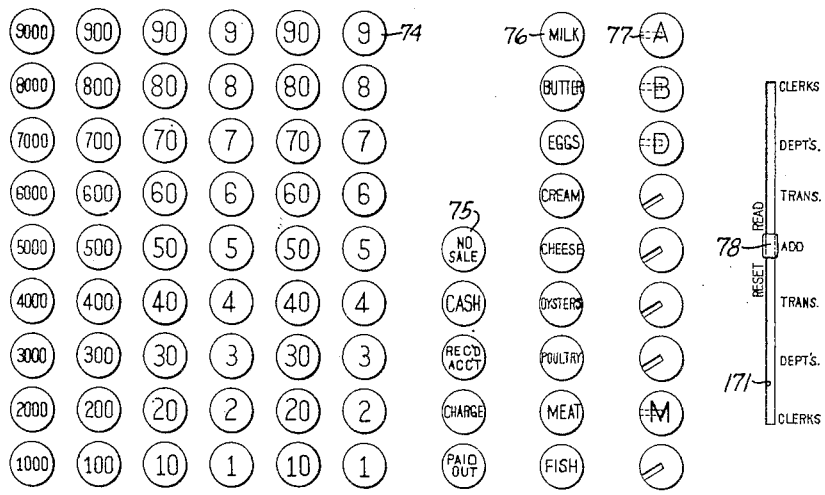
Fig. 1 is a diagrammatic view of the keyboard.

*General description.*—The machine in the illustrative form disclosed herein is designed more especially for use in markets and the like, the keyboard being arranged suitable for such types of business.

However, applicant does not wish to limit this mechanism to the particular type of business which is disclosed by the characters on the keyboard because the fundamental features of the keyboard arrangement, and the functions and construction of the registering mechanism is such that the machine is well adapted for use in many other lines of business. In fact, the mere substitution of different inscriptions on the keys is all that is necessary to render the machine adaptable for the requirements of other mercantile lines.

Described in general terms, the machine includes three groups of totalizers mounted in a framework located at the back of the machine and removable therefrom without disassembling any of the parts of the totalizers. To accomplish this result, all of the operative elements of the registering mechanism, associated with the actuating elements of the three groups of totalizers, have slotted connections with each other so that they may be readily separated without disturbing the position of each with respect to the other elements with which they are associated.

The frames supporting the groups of totalizers are adjustable, so that any one totalizer or a plurality of them may be moved into co-operative relation with the differential actuators controlled by manipulative means such as banks of depressible keys.

*Operating mechanism.*—The motor mechanism which it is desired to use in connection with the present invention is of a well-known type described in Letters Patent of the United States No. 1,144,418 granted to Charles F. Kettering and William A. Chryst on June 29, 1915, and for a detailed description of the same, reference may be had to this patent.

The motor itself is not shown in these drawings, but the worm on the armature shaft of a motor and the connections from this worm to the main cam shaft are illustrated in Fig. 4.

The main section of the mechanism of this machine is supported by two side frames 27 and 28 (Figs. 3 and 15) mounted on a base 29. A clutch shell 30, (Fig. 4) forming one part of the motor clutch device has secured thereto a worm gear 31, which is rotated by a worm 32 on the armature shaft 33 of the motor (not shown). A disk 34, forming another member of the clutch, co-operates with rollers 35 and is connected thereby to the clutch shell 30 upon release of the machine as is fully illustrated and described in the aforesaid Kettering and Chryst patent. The motor clutch also has locking disks 36, having locking shoulders engaged by a nose on a locking lever 37, pivoted at 38 to the frame 27. These locking disks 36 perform certain functions in connection with the release and operation of the clutch and the closing of the electric circuits, which parts and their functions are fully described in the above mentioned patent and therefore it will not be necessary to describe them in detail here.

The opposite end of the lever 37 carries a roller 39 normally resting upon the upper edge of a curved finger 40 of an arm 41, secured to a shaft 42.

When the arm 41 is rocked counter-clockwise (Fig. 4) to release the machine, as will be hereinafter described, the locking lever 37 is rocked counter-clockwise by a spring 43, and thus disengaged from the shoulder on the disk 36. This movement of the lever 37 is limited by a stud 44 on the frame 27. When the lever 37 is released from the disk 36, the disk and the parts operated thereby are moved by spring action to effect the connection of the motor clutch and the closing of the electric circuit through the motor, as described in the above mentioned Kettering and Chryst patent.

The clutch disk 34 is fastened to a sleeve 50 mounted on a stud 51, on the frame 27. A gear 52, also secured to the sleeve 50, meshes with an intermediate gear 53 which in turn meshes with a gear 54, secured to a main cam shaft 55. Through this gearing, the motor (not shown) gives the shaft 55 one complete rotation for each adding operation of the machine. To restore the locking lever 37 to locking position near the end of an operation of the machine, a link 56, is pivoted at its upper end to the lever 37 and has a slot 57 near its lower end, by means of which it is guided by a pin on the frame 27, and co-operates with a stud 58, on the gear 53. Near the end of an operation of the machine, this stud engages a lower surface 59 of the link 56. This surface 59 is so constructed that when the stud 58 contacts the same it causes the link 56 to be raised, thereby moving the lever 37 back to normal locking position.

As will be described later, the arm 41 is rocked back to its normal position just before the stud 58 passes off the surface 59, in order to retain the locking lever 37 in its normal position.

It may, in some instances, be desirable to actuate the machine by hand instead of by the motor gearing just described. The machine is provided with a manual operating means in addition to the motor driving mechanism. A hand crank (not shown) carrying a gear 65 (Fig. 2) may be rotatively mounted upon a stud 66 on the frame 28. The handle and gear may be held against longitudinal movement in any well known manner. The gear 65 meshes with a large gear 67, loosely mounted upon a stud 68 on the frame 28. The gear 67 in turn meshes with a gear 69 secured to the main cam shaft 55. The ratio of the gears comprising the train just described is such that two rotations of the gear 65, by the operating handle, causes a half rotation of the gear 67 and one complete rotation of the gear 69 and shaft 55.

The functions of the arm 41 and locking lever 37 are the same as described in connection with the motor drive. The only difference in the two driving means resides in the fact that in one case the shaft 55 is rotated by a motor and in the other case by a hand operated crank.

In order to make sure that the cam shaft 55 comes all the way home at the end of each operation, there is provided a disk 70 (Figs. 2 and 3) secured to the right hand end of the cam shaft 55. An arm 71, pivoted to the frame 28, carries a roller 72, which is held in contact with the disk 70 by a spring 73.

When the cam shaft 55 is rotated clockwise (Fig. 2) the arm 71 is rocked clockwise. The high portion of the disk is rounded so that just before the end of the rotation of the cam shaft the arm 71 can be rocked counter-clockwise by the spring 73, which causes the shaft 65 to be brought all the way home.

*Keyboard.*—The keyboard, as shown diagrammatically in Fig. 1, has six banks of amount keys 74, one bank of transaction keys 75, one bank of department keys 76, one bank of clerks' keys 77 and a total controlling lever 78 used to control the machine for total and sub-total operations of the registering mechanism. The construction of the key banks is very simlar to that shown and described in a patent granted to applicant on October 9, 1917, No. 1,242,170. For this reason only a brief description of the key banks will be necessary here.

The keys of each bank are mounted in an individual frame 80 (Figs. 6 and 8) mounted on cross rods 81. Springs 82 are employed to normally retain the keys in their undepressed positions.

The amount keys 74 (Fig. 6) co-operate with flexible bars 83 and locking detents 84. The former are supported at their upper and lower ends respectively, by arms 85 and 86, pivoted on pins 87 carried by the key frame 80. When a key is depressed the inclined edge of a shoulder 88 on the key engages a corresponding pin 89 on the flexible detent. This moves the detent 83 downwardly until the shoulder is past the pin when the detent rises slightly retaining the key in the depressed position. The arm 86 engages a pin 90 on a zero stop pawl 91 normally in the position shown in Fig. 6. When the flexible detent 83 is moved downwardly, the pawl 91 is rocked counter-clockwise to its ineffective position. A spring 92 connected to the pawl 91 and the key frame 80 serves to retain the pawl 91 in normal position.

The locking bars 84 for the banks of amount keys have hooks 100 which, immediately upon the release of the machine, pass over pins 101 on the depressed keys and under pins 101 on the undepressed keys. This prevents manipulation of the keys during an operation of the machine. In order to give the locking bar 84 the required upward movement, the upper supporting arms 102 for the locking bars have extensions 103 engaging a rod 104 carried by arms 105 fast on the shaft 42. This shaft is rocked clockwise (Fig. 6) when the machine is released, as will be hereinafter described, whereupon the rod 104 lifts the locking bars 84 into locking position.

The clerks' keys are removable and when put in the machine are inserted in a lock barrel 110 (Fig. 8) carried in a frame 111 superimposed on the regular key frame 80, mounted on the rods 81. In the present instance only four clerks' keys are shown, but, as is perfectly clear from the diagrammatic view in Fig. 1, nine may be used. As this construction is fully illustrated and described in the parent case, it will be sufficient here to say that the clerks' keys co-operate with key stems 112 mounted in the usual manner in the key frame 80.

The key stems 112 co-operate with studs 113 (Fig. 9) on a flexible detent 114 carried by arms 115 and 116 (Fig. 8), pivoted in the key frame 80. When a key stem 112 is depressed by a key 77, the detent 114 (Fig. 9), is moved downwardly and the flat portion of the stud 113 engages a shoulder 117 thus locking the key in the depressed position and holding the detent in its moved position. The arm 116 (Fig. 8), engages a pin 118 on a zero stop pawl 119 which is pivoted in the key frame and held in normal position by a spring 120.

The key stems 112 also carry pins 121 which co-operate with slots 122 in a releasing bar 123 (Fig. 8) pivoted at its upper end to an arm 124 mounted in the key frame 80 and at its lower end to an arm (not shown). The arm 124 has a pin 125 engaging a slot in an arm 126 integral with a collar 127 (Figs. 8 and 14) loose upon a shaft 128. Also integral with the collar 127 is an arm 129 the inner end of which normally rests in front of one of two L-shaped arms 130 (Figs. 8 and 14) which are integral with a sleeve 131 on the machine release shaft 42.

The sleeve 131 has a projection 132 engaging a slotted arm 133 fast on the shaft 42. By reason of this construction, rotation of the shaft 42 will, through the arm 133 and projection 132 rotate the sleeve 131 and at the same time permit movement of the sleeve longitudinally of the shaft.

The construction and elements of the department key bank are the same as the clerks' bank except in the department bank the keys 76 are not mounted in a superimposed frame, but are integral with the key stems. This key bank has a flexible detent 114 (Fig. 14) which co-operates with the zero stop pawl (not shown) but like that shown in connection with the clerks' bank, a releasing bar 123, an arm 124 and pin 125 co-operating with an arm 126 on a collar 127. This collar has integral therewith an arm 140, the inner end of which lies in front of an L-shaped arm 141 integral with the sleeve 131.

The transaction bank is like the department bank except that it has, in this case, only five keys. A greater number of keys up to nine may be used in this bank. This bank of keys also has a detent 114 (Fig. 14) co-operating with a zero stop pawl (not shown) but like the zero stop pawl associated with the clerks' bank; a releasing bar 123, arm 124, and pin 125, co-operating with an arm 126 on a collar 127. This collar 127 has integral therewith an arm 142, the inner end of which lies in front of an L-shaped arm 143 integral with the sleeve 131.

The three arms 129, 140 and 142 which are associated with the clerks' departments and transaction key banks respectively, and which abut the arms 130, 141 and 143 all integral with the sleeve 131 (Fig. 14) prevent movement of said sleeve in a clockwise direction (Fig. 8), the engagement of any one of these arms serving to prevent such clockwise movement. Consequently in the normal condition of the machine, when the total lever 78 is in the position shown in Figs. 1 and 15, it is necessary to rock all three arms 129, 140 and 142 out of the path of the three integral arms on the sleeve 131 in order to permit clockwise movement of said sleeve. Therefore, in order to move said arms a key must be depressed in the transaction, departmental and clerks' banks during each adding or accumulating operation of the machine.

The sleeve 131, as previously described, through the projection 132 and arm 133 pinned to the shaft 42 is rocked with said shaft, the latter receiving its rocking movement by means of an arm 144 (Fig. 2) pinned to the shaft 42. The arm 144 has a pin 145 projecting in a slot 146 in a link 147. A compression spring 148 tends to rock the arm 144 and shaft 42 clockwise (Fig. 2), this movement being prevented as previously described.

When, however, the shaft 42 is permitted a clockwise movement (Fig. 2) by depression of a key in the transaction, departmental and clerks' banks, the arm 41 (Fig. 4) is rocked counter-clockwise thereby effecting the coupling and starting of the motor for driving the main drive shaft 55 as has been heretofore described, or permitting a manual operation by the use of the crank handle. Simultaneously with the rocking of the shaft 42 to release the machine, the arm 105 (Fig. 6) will be rocked clockwise, thereby elevating all of the locking bars 84 to lock all of the amount keys in either their depressed or undepressed position.

It is not necessary to depress the keys in the control banks simultaneously for the reason that as each key is depressed, it is held in depressed position by the flexible detent 114 and locked in this depressed position after the machine is released for the reason that after the arms 129, 140 and 142 are rocked by the movement of the bars 123 they are held in this rocked position by the arms 130, 141 and 143 which rest beneath them after the shaft 42 has been rocked to release the machine.

To effect the release of the amount keys and also the control keys, the link 147 (Fig. 2) has a slot 149 having a substantially horizontal offset portion into which projects a pin 150 on an arm 151 pivoted on a stud 152 on the frame 28. The arm 151 carries a roller 153 engaging a cam race 154 formed in the large gear 67.

This large gear 67 as previously described receives a one-half rotation for each adding operation of the machine. The cam race 154 is therefore provided with two lobes 155 which are so located that near the end of the adding operation of the machine the arm 151 is given a clockwise movement thereby lowering the link 147 (Fig. 2) and rocking the arm 144 and consequently the shaft 42 counter-clockwise past its normal position, and then moving the shaft 42 clockwise to its normal position.

After the machine has been released the stud 145 (Fig. 2) occupies a position at the top of the slot 146 in the link 147. Consequently this first movement of the shaft 42 in a counter-clockwise direction (Figs. 2 and 6) causes the rod 104 (Fig. 6) to engage the flexible detent arms 85 thus lowering said detents. The locking bars 84 are also lowered by this movement of the rod 104 thus permitting the springs 82 to restore all of the depressed keys to their undepressed positions.

When the shaft 42 is rocked in this manner, the arm 41 (Fig. 4) is moved to its normal position, the locking lever 37 having been restored to normal locking position by the link 56 in a manner previously described.

The above described movement of the shaft 42 past its normal position is employed to effect the release of the depressed transaction, departmental and clerks' keys. As the shaft 42 is rocked counter-clockwise (Figs. 2, 6 and 8) by the cam 155 and associated lever previously described, the arms 130, 141 and 143 (Fig. 14) are also rocked counter-clockwise (Fig. 8) from their positions beneath the arms 129, 140 and 142 to which they had been moved upon the release of the machine. As the shaft 42 rocks past its normal position, an arm 156 (Fig. 14) pinned to the shaft 42 and projections 157 and 158 (Fig. 8) on the sleeve 131 engage projections 159 on the flexible detents 114 of the three control banks and force them downwardly. As the releasing bars 123 are free to move upwardly after the removal of the arms 130, 141 and 143, this movement of the arm 156 and projections 157 and 158 permits the key springs 82 of the control banks to restore the depressed keys in these banks to their undepressed position.

In order to prevent the operator from retaining the keys in the transaction, departmental and clerks' banks in depressed position until the end of one complete rotation of the machine, and thereby causing an immediate second operation of the machine, arms 160 (Figs. 8 and 14) pivoted on the shaft 128 co-operate with the L-shaped arms 130, 141 and 143. When the machine is released, the arms 130, 141 and 143, move between the arms 129, 140 and 142 respectively, and the arms 160 there being an arm 160 for each arm 129, 140 and 142. When the shaft 42 is rotated counter-clockwise (Fig. 8) past normal position near the end of the operation of the machine, the arms 130, 141 and 143 are carried rearwardly past normal position so that if the operator retains any of the keys 75, 76 or 77 in depressed position a spring 161 (Fig. 8) connecting the arms 160 with the arms 129, 140 and 142 rocks the arms 160 so that a shoulder 162 thereon engages the L-shaped arms 130, 141 and 143 thus preventing a clockwise movement of these arms and consequently of the shaft 42 which movement is necessary to release the machine. When the operator finally removes his fingers from the depressed keys 75, 76 and 77, the arms 129, 140 and 142 are lowered in front of the L-shaped arms 130, 141 and 143 and as the lower edges of the former arms engage the upper edges of the arms 160 these arms at the same time are moved so that the shoulders 162 are out of engagement with the arms 130, 141 and 143 thus permitting these arms to rock a slight distance clockwise (Fig. 8) to their normal position abutting against the arms 129, 140 and 142.

This mechanism just described applies not only to a case where a key in all three banks may be held depressed, but applies to a case where a key in only one bank may be held depressed during a totaling operation. It is just as effective during totaling operations as during adding operations.

*Total lever.*—The total lever 78 is loosely pivoted near the right hand end of the machine on a shaft 170 supported by the side frames 27 and 28. This lever 78 is movable in a slot 171 (Fig. 1) in a frame 172 (Fig. 15) supported on the rods 81.

If the lever 78 is moved above its central or "add" position, it controls the machine for sub-total or reading operations and when moved below its "add" position it controls the machine for grand total or reset operations. Locks 173 are provided to prevent unauthorized persons from operating the total lever. When the locks are operated by keys inserted to lock the total lever in adding position, the bolt of one of the locks closes the slot 171 above and the bolt of the other lock closes the slot 171 below the total lever 78.

When the total lever is in the position to control the machine for a sub-total or grand total operation, only one of the keys 75, 76 or 77 is depressed since at this time only one individual totalizer is to be selected and engaged with the differential mechanism as will be hereinafter described in detail.

The mechanism just referred to constitutes an interlocking device between the keys 75, 76, 77 and the total lever 78 and since this mechanism has been made the subject of a divisional application of the same parent case of which this case is a divisional application, only a portion of this mechanism is shown here. It will be but briefly described as follows.

The total lever 78 has a gear segment 163 (Fig. 15) meshing with a gear 164 secured to a drum cam 165 (Fig. 14) which engages a roller 166 on a sleeve 167 loosely mounted on a reduced portion of the sleeve 131. An arm 168 (Fig. 15) secured to the sleeve 167 is forked to fit over the shaft 128 to prevent rotation of the sleeve 167 but to permit oscillation of the sleeve 131.

When the total lever 78 is moved either up or down in the slot 171 from its central adding position to its sub-total or grand total position, it will, by means of the segment 163, gear 164, cam 165, roller 166 and sleeve 167 move the sleeve 131 either towards or away from the frame 28 (Fig. 14). This movement of the sleeve 131 will, as the total lever is moved each step in either direction, move the L-shaped arms 143, 141 and 130 out of contact with two of three arms 142, 140 and 129, so that only one of the latter will engage one of the L-shaped arms. Therefore the movement of only one of the arms 142, 140 and 129 is necessary to release the machine. The arm, that abuts its associated L-shaped lever, will prevent the release of the machine, and is the arm associated with the key bank, which is selected by the total lever to take the sub-total or grand total of the individual totalizer, which may be selected by the depression of the key in this bank, which will hereinafter be described in detail.

It is therefore understood that through the mechanism just described, the movement of the total lever 78 will select one of the banks of keys 75, 76 or 77 so that totals or sub-totals may be taken of the selected individual totalizer associated therewith.

Therefore when the total lever 78 is moved to the "trans" position illustrated in Fig. 1, either above or below the "add" position then only a key 75 in the transaction bank may be depressed, as the keys 76 and 77 will be locked out. When the total lever 78 is moved to either one of the two "depts" positions then only one of the keys 76 may be depressed, the keys 75 and 77 being locked out. When the total lever 78 is moved to either one of the "clerks" positions, then only one of the clerks' keys 77 may be depressed the other keys 75 and 76 being locked out.

The total lever 78 has a cam slot 174 (Fig. 15) which receives a roller 175 on a lever 176 loosely mounted on a rod 177 supported by the frames 28 and 29. An arm 178 pinned to a shaft 179 supported by the frames 28 and 29 carries a roller 180 which projects through a slot 181 in a lever 182 loosely mounted on the rod 177. This roller 180 also projects through a slot 183 in the lever 176.

When the total lever 78 is moved into either its sub-total or grand total positions, the cam slot 174 actuates the lever 176 so that through the cam slot 183 and roller 180, the shaft 179 is given a clockwise movement. This shaft 179 (Fig. 6) has secured thereto a pair of arms 187 which carry a rod 188 of a length to extend across all of the banks of amount keys 74. When the total lever 78 is moved as above described to rock the shaft 179, the rod 188 is moved clockwise until it is positioned in front of tails 189 on the arms 86 which support the lower ends of the flexible detents 83. When the rod 188 has been moved to this position, the flexible detents 83 are held rigid against the inclined shoulders 88 on the key stems thus preventing their depression.

Means is provided for preventing a release of the machine unless the total lever 78 has been moved to its exact, correct position to control the machine for adding, sub-total or total operations, and means is also provided for locking the total lever 78 in any of its adjusted positions during the operation of the machine whether it be an adding operation or a total or a sub-total operation. This mechanism includes a roller 192 on the total lever 78, which roller co-operates with the scalloped upper edge of a lever 193 (Fig. 15) secured to a sleeve 194 loosely mounted on a stud 195 on the frame 29. Also secured to the sleeve 194 is an arm 196 having a pin 197 co-operating with a notch in an arm 198 loose on a stud 199 on the frame 29. A spring 200 stretched between the arm 198 and a lever 201 loose on the shaft 170 tends to rock the arm 198 counter-clockwise which through the arm 196 holds the lever 193 so that its scalloped edge will contact with the roller 192. The arm 198 has a lateral projection 202 arranged to co-operate with an arm 204 (Fig. 2) fast upon the shaft 42.

When the roller 192 is positioned within any of the scalloped depressions of the lever 193, the arm 198 will be so positioned that the extension 202 will be out of the path of movement of the arm 204, and consequently when the sleeve 131 (Figs. 8 and 14) is released through the depression of a key in each of the banks 75, 76 and 77 during an adding operation, or when said sleeve is released through the depression of any one of these keys during a sub-total or total operation, the shaft 42 will be free to be rotated clockwise (Fig. 2) under the influence of the spring 148 to release the machine and start the motor. However, in moving the total lever 78 should the roller 192 be positioned on one of the high points of the scalloped edge of the lever 193 the projection 202 of the arm 198 would then stand in the path of movement of the arm 204. Consequently even though the sleeve 131 should be released by the depression of one or more keys 75, 76 or 77, the extension 202 would still be in the path of movement of the arm 204 and prevent movement of the shaft 42, thus preventing the release of the machine.

Figure 17:
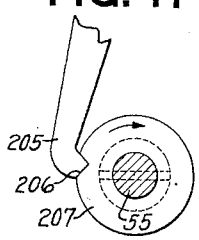
Fig. 17 is a detail of the cam and part of the lever for locking the total lever against movement during the operation of the machine.

The above described mechanism insures that the total lever be set in its exact position before the machine can be released and the motor started. After the machine has been released and begun its operation the lower end 205 (Fig. 17) of the lever 201 is cammed out of a notch 206 in a disc 207 fast on the cam shaft 55 and will ride upon the true periphery of said disc during the entire operation. This movement of the arm 205 causes the arm 201 to be moved so that its upper end will rest beneath a flattened pin 209 on the lever 193. Therefore, during the operation of the machine the lever 201 prevents any downward or counter-clockwise movement of the lever 193, thus holding the scalloped edge of said lever against the roller 192 on the total lever 78 and preventing any movement of this lever.

When, however, the lower end of the arm 205 falls within the notch 206 the upper end of the lever 201 is moved from beneath the pin 209 thus permitting the total lever to be moved to any of its various positions.

*The differential mechanism.*—To drive the differential mechanism of the machine a pair of cams 210 and 211 (Figs. 3 and 6) are secured to the cam shaft 55 adjacent its left end. Co-operating with these two cams are rollers 212 and 213 respectively carried by a lever 216 loosely mounted on a shaft 217 supported by the frames 28 and 29. The lever 216 has an integral segment 218 meshing with a segment 219 fast on the shaft 170.

When the shaft 55 is rotated, the cams 210 and 211 through the segment 218, will oscillate the segment 219 and shaft 170 first clockwise and then counter-clockwise as viewed in Fig. 6.

*Differential mechanism for amount banks.*—Fastened to the shaft 170 are a plurality of driving segments 230 (Figs. 3 and 6), one for each of the denominational orders of the totalizers. Loose upon the shaft 170 and associated with each of the driving segments 230 is a spider shaped plate 231 having integral therewith a gear segment 232 arranged to mesh with teeth 233 on a slide 234 mounted for vertical reciprocation on the shaft 217 and a rod 235 (Fig. 6).

Also loose upon the shaft 170 and associated with each of the plates 231 is a lever 236 having a right angle flange 237 arranged to contact with either the zero stop pawl 91 or the stem of the depressed key 74 of its associated bank. Pivoted on a stud 238 on the plate 231 is a lever 239 the forward end of which engages the underside of the flange 237. This lever 239 also carries a stud 240 which normally engages a slot in the lever 236. Also pivoted upon the stud 238 is a latch pawl 241 normally in engagement with a shoulder 242 on the driving segment 230. This pawl 241 is connected to the lever 239 by means of a pin 243. A compression spring 244 between the plate 231 and the upper end of the lever 236 holds the pawl 241 in engagement with the shoulder 242.

When the parts are in the position shown in Fig. 6 a clockwise movement of the segment 230 rocks the plate 231 and lever 236 until the flange 237 engages the stem of the depressed key. This arrests the clockwise movement of the lever 236 but the segment 230 continues to move clockwise. This continued movement of the segment 230 rocks the pawl 241 with the pin 240 as a fulcrum until the tail of the pawl has been disengaged from the shoulder 242 on the segment 230. The above movement of the pawl 241 causes its nose to engage a notched plate 245 in a position appropriate to the key which has been depressed.

The nose of the pawl 241 is now held and locked in the plate 245 due to the fact that the rear end of the pawl is now riding upon the outer periphery of the segment 230.

The above described differential setting of the plate 231 causes its segment 232 to set the slide 234 to a position corresponding to the value of the key depressed.

The slide 234 for each bank is of course positioned according to the value of the key depressed in the bank associated with that particular slide.

If a key is not depressed in an amount bank the zero stop pawl 91 for that particular bank operates the latch pawl 241 to stop the plate 231 and the lever 236 in the zero position. When, however, a key is depressed the arm 86 through its engagement with the pin 90, as previously described, rocks the zero stop pawl out of the path of movement of the flange 237 so that the differential mechanism may be set according to the value of the key which is depressed.

In order to allow time for the latch to disconnect in the zero position, so that the actuating slide 234 will not be moved when no amount key has been depressed, the plate 231 carries a stud 246 (Figs. 5 and 6) engaging a slot 247 in the forward end of the slide 234. It will also be noticed that the segment 232 is not in engagement with the teeth 233 when the parts are in their normal position.

The slot 247 is arranged so that part of it is concentric with the center of the shaft 170. When the plate 231 is rocked clockwise, the stud 246 slides in this concentric portion until the segment 232 engages an edge 248 just below the lowest tooth 233. If there has been no key depressed, and the zero stop pawl 91 causes the latch 241 to become disengaged from the segment 230 in the zero position, the plate 231 will be rocked slightly, but not enough to cause the stud 246 to become disengaged from the concentric portion of the slot 247. Consequently, when the latch 241 is disconnected in the zero position, stud 246 and slot 247 keep the slide 234 from being moved out of normal position.

If any key in the bank has been depressed and the plate 231 is moved beyond the zero position, the stud 246 moves in the slot 247 until the segment 232 becomes engaged with the teeth 233. The segment 232 then moves the teeth 233 and consequently the slide 234 thus causing the stud 246 to be disengaged from the concentric portion of the slot 247 and to engage the remaining portion and finally become entirely disengaged from said slot.

After the totalizers have been engaged with teeth 249 on the rear side of the slide 234 (in a manner to be hereinafter described)

the cams 210 and 211 cause the shaft 170 to be rocked counter-clockwise to its home position. As the segment 230 moves toward its home position, the tail of the pawl 241 again becomes engaged with the shoulder 242 and its nose is disengaged from the plate 245. At the same time that the pawl 241 moves clockwise, a surface 250 of the segment 230 strikes a pin 251 on the plate 231 thus restoring this plate and the lever 236 to their normal positions. The pin 246 by its engagement with the slot 247 restores the slide 234 to normal position.

During total and sub-total operations the driving segments 230 and associated parts are given two oscillations clockwise and counter-clockwise to perform their necessary functions during such operations as will be hereinafter described. Consequently the latch pawls 241 are swung first clockwise and then counter-clockwise twice in rapid succession when the machine is motor driven. This rapid movement tends to whip the latch pawls out of engagement with the driving segment 230 as they change their direction of movement at the lowest point of their travel.

To counteract this whipping force and to insure a positive couple between the latch pawls 241 and the driving segments 230, a block 255 (Fig. 6) is secured to the key frame 80 adjacent the plate 245 and has its lower end extended beyond said plate at a point just below the upper end of the zero stop pawl 91. A pin 256 on the associated latch pawl 241 contacts the lower end of the block 255 when in the lowermost position. When these parts are in engagement the tail of the pawl is held in contact with the shoulder 242 of the segment 230. Since each latch changes its direction of movement just below its zero stop pawl 91 it is prevented from whipping away from the driving segment by the pin 256 and block 255. The block 255 is not necessary at the upward limit of the latch pawl's movement for the reason that at this point the pawl and associated parts are held by the engagement of the surfaces 250 of the segments with the stud 251 on the arm 231.

A whipping action such as that just described may also occur as the latch pawls move intermediate at the points marking the limits of their clockwise and counter-clockwise movement due to a stop or starting movement of the driving segment 230 or a sudden reduction and increase of their speed. In order to counteract or compensate this whipping action a weight 257 is loosely mounted on the stud 238, the potential force of which holds a recess therein against a pin 258 on the lever 236. Any sudden movement of the lever 236 and the plate 231 that might tend to separate them and dislodge the pawl 241 from the shoulder 242 will be counteracted by the lagging force of the weight 257 engaging the pin 258 which will hold the lever 236 and the plate 231 together thereby retaining the positive couple between the pawl 241 and its driving segment except when said couple is disconnected positively by the engagement of the flange 237 with the zero stop pawl, in case no key in the bank is depressed, or with the end of the depressed key.

*Differential mechanism for control banks.*—The differential mechanisms associated with the control banks which are namely the transaction, department and clerks' banks are practically identical with the differential mechanisms associated with the amount banks which have just been described in detail.

By referring to Fig. 8 it will be seen that the differential mechanism which is associated with the clerks' key bank, and which may be taken as an example since the differential mechanisms associated with all of the control banks are the same, includes the driving segments 230 cooperating with which is a spider shaped plate 265 and a lever 266 very similar to the plate 231 and lever 236 of the amount differential mechanism. The plate and lever of the amount differential, however, differ from the plate and lever of the control differentials in that the latter are not provided with means for co-operating with the totalizers as are the differential mechanisms associated with the amount banks, which difference in construction and function will hereinafter be set forth in detail under the appropriate heading. Each of the levers 266 and plates 265, however, support a latch pawl 241 and its associated elements as do the differential mechanisms associated with the amount banks.

The function and operation of the driving segments 230, the plates 265, levers 266 and the latch pawls 241 associated with the control banks are identical with those of the differential mechanisms associated with the amount banks. Attention is called to the fact, however, that the spider plates 265 for the control banks are provided with a gear segment 267 which meshes with teeth 268 of a slide 269 mounted for vertical reciprocation on the shafts 217 and 235. These slides, however, do not co-operate to actuate the totalizers but they do co-operate with mechanism for selecting and engaging the totalizers with the teeth 249 on the slides 234.

This totalizer engaging and selecting mechanism will be later described, it being sufficient here to state that each slide 269 has teeth 270 with which mesh gears associated with the totalizer engaging and selecting mechanism which will be hereinafter described.

*Totalizers.*—In the present machines three totalizer lines are provided each of which includes a plurality of individual totalizers, all of which are mounted upon the frame work that is detachably fastened to the machine frames 28 and 29 so that it may be readily removed for inspection and repair and also to assist in providing access to the other mechanisms of the machine.

The frame work for supporting the totalizers consists of a back frame 275 (Fig. 15), two side frames 276 and 277 and an intermediate frame 278 (Fig. 12). The back frame 275 is secured to the side frames 27 and 28 and to the base 29. The two side frames 276 and 277 are secured to the back frame and are in alignment with the side frames of the machine 27 and 28, the side frames 27 and 28 are notched (not shown) to receive the frames 276 and 277. The frame 278 is also secured to the back frame 275.

There are three shafts 280 (Figs. 6 and 12) one associated with each of the totalizer lines and located directly one above the other. The right hand end of each of the shafts 280 fits within a recess in a shaft 281 and these two shafts are pinned together by a pin 282 which passes therethrough and also through an arm 283 thus maintaining the two shafts and arm rigid one with the other. Pinned to each of the shafts 280 near the frame 276 is an arm 284 (Figs. 7 and 12) identical with the arm 283. These arms 283 and 284 support a shaft 285 which is rigidly secured thereto. Mounted upon each of the shafts 285 is a group of totalizers, each of which comprises a plurality of pinions 286.

Each totalizer includes a group of pinions 286, the pinions of like denomination being grouped together. Each totalizer of the group of totalizers therefore consists of one pinion 286 in each group of pinions. Therefore if the first pinion 286 of each group is engaged with the differential actuating teeth 249 on the slides 234 (Fig. 6), a certain individual totalizer will be operated. If the second pinion of each group of totalizers is engaged with the actuators, a different totalizer will be operated. This arrangement of interspersed multiple totalizers is described in Letters Patent of the United States No. 1, 109,763 granted on September 8, 1914 to Charles F. Kettering.

In order to shift each totalizer line so that any desired totalizer may be brought into co-operative relation with the teeth on the differential slide 234 there is provided on each of the shafts 281 a short sleeve 288 (Figs. 8 and 12) which is loosely mounted thereon but held against longitudinal movement by fitting within a notch 287 (Fig. 19), in a totalizer selecting and engaging bar 289 secured to the bottom of each of the shafts 281. Integral with each of the sleeves 288 is an arm 290 bifurcated to receive a shaft 291 rotatably mounted in the frames 277 and 278 (Fig. 12). Each sleeve 288 has a roller 292 co-operating with a drum cam 293 secured to the shaft 291. Secured to each of the drum cams 293 is a gear 295 which meshes with the teeth 270 (Fig. 8) of its associated differential slide 269.

The drum cams 293 are of such a size, and the gears 295 carried thereby are so located on the shaft 291 (Fig. 12), that the uppermost gear 295 meshes with the teeth 270 on the differential slide associated with the transaction keys 75; the center gear 295 meshes with the teeth 270 on the differential slide associated with department keys 76 and the lowermost gear 295 meshes with the teeth 270 on the differential slide 269 associated with the clerk's keys 77.

Since these associated differential slides 269 are, during the operation of the machine, reciprocated different distances depending upon which of the keys in the associated banks are depressed, the gears 295 will be rotated distances commensurate with the keys depressed in each of the control banks. The rotation of the gears 295 in the manner just mentioned through the drum cams 293 causes the sleeves 288 and consequently the shafts 281 and 280 to be shifted differentially according to the key which has been depressed thus bringing into the proper actuating position, the totalizer on the respective line which corresponds to the keys which have been depressed in the various banks.

After the totalizers have been selected in the manner just described, they are engaged with the teeth 249 (Fig. 6) on the differential slides 234 in a manner to be hereinafter described in detail.

*Totalizer aligning mechanism.*—A sleeve 296 (Fig. 12) surrounds each shaft 281 and fits within an opening in the frame 278. A similar sleeve 297 surrounds each of the shafts 280 and fits within an opening in the frame 276. These two sleeves form bearings for the shafts 280 and 281. Each sleeve has rigid therewith an arm 298 (Figs. 7 and 12) which arms are parallel. The arms are adjacent the frames 276 and 278 and have secured thereto at their upper end an aligner bar 299 formed to fit within the shaped notches in the upper end of the arms 283 and 284 so that the arms 298, the aligner bars 299, and the arms 283 and 284 rock as a unit.

Each aligner bar 299 fits between the teeth of the totalizer pinions 286 (Fig. 6) and provides a guide for these pinions when the shaft 285 is moved to select a certain individual totalizer. At nine equally spaced points each of the aligner bars 299 has a notch 300 (Fig. 12) of a width slightly greater than the thickness of a totalizer pinion 286. These notches are arranged in the same vertical plane as the differential slides 234 so that whatever set of totalizer pinions 286 is positioned for actuation by the teeth 249 on the slides 234 they will be in alignment with the notches 300 and free to rotate within said notches. However, since the aligner bars 299 engage all the other totalizers pinions 286 they will be prevented from rotation. This mechanism provides an efficient means for permitting a rotation of the totalizer pinions 286 comprising each selected individual totalizer and at the same time provides means for locking against movement the totalizer pinions of those totalizers which are not selected.

Since the aligner bar 299 has notches 300 at nine points to permit the rotation of the pinions comprising the selected totalizers, just described, when the shafts 285 are moved to select a totalizer, these totalizer pinions will be free to come out of alignment with the other totalizer pinions as they pass the notches 300 cut in the aligner bars 299. To meet this contingency an aligning mechanism is provided to bridge the notch 300 and to insure that none of the totalizer wheels 286 move out of alignment during the time when the totalizer lines are slid.

This means consists of an aligner bar 301, one associated with each of the totalizer lines, (Figs. 6 and 12). Each of the bars 301 is supported by a pair of arms 302 (Fig. 12) pinned to a shaft 303 mounted in the arms 298, which arms it will be remembered support the aligner bar 299.

The left hand arm 302, as viewed in Fig. 12, one of which is shown in detail in Fig. 7, has a cam slot 304 which receives a pin 305 carried by a vertically movable bar 306. The bar 306 is guided at its lower end by a rod 307 extending between the frames 276 and 277 and at its upper end by a stud 308 on a bracket (not shown) secured to the frame 276.

The bar 306 has three pins 305 one engaging each of the left hand arms 302. Normally these pins occupy a position in the substantially vertical portion of the cam slot 304. However, just previous to the time that the shafts 285 carrying the totalizer pinions 286 are moved to select individual totalizers for actuation, the bar 306 is lifted, by means to be hereinafter described. The lower end of the bar 306 engages a pin 309, on a bell crank 310, loosely mounted on a shaft 311 supported by the side frames 27 and 28. The bell crank 310 also carries a roller 312 co-operating with a cam race 313 in a disk 314 fast on the main cam shaft 55.

During the operation of the machine when the disk 314 is rotated counter-clockwise (Fig. 7) the bar 306 through the bell crank 310 is raised and lowered. The raising of the bar 306 through the pins 305 and slots 304 rock the aligner bars 301 into engagement with the totalizer pinions 286. This takes place just prior to the time the totalizer shafts 285 are moved to select the totalizers for operation. After the totalizers have been shifted to select a certain individual totalizer, during which time the aligner bar 301 is in engagement with the pinions 286, the cam race 313 actuates the bell crank 310 to lower the bar 306. This disengages the aligner bars 301 from the pinions 286 so that, when the pinions are rocked into engagement with the teeth 249 on the differential slides 234, they will be free to be rotated according to the movements of the slides.

*Transfer mechanism for totalizers.*—The transfer mechanism for the totalizers will be but briefly described, as it is not necessary for a full understanding of the invention claimed herein. For a full illustration and description of the transfer mechanism, reference may be had to the parent case, Serial No. 299,112.

For this case it is sufficient to say that, co-operating with each of the totalizer pinions 286 is a pinion 316 (Fig. 6) which is always in engagement with said totalizer pinion. Co-operating with the pinion 316 is a transfer pawl 317 carried on an arm 318 pivoted on a sleeve on the shaft 280. The pawl is held in engagement with the pinion 316 by a spring 319. A long tooth 320 on the totalizer pinion 286 co-operates with an arm 321 fast to a sleeve 322 on the shaft 303, which sleeve is also fast to an arm 323, having a hook 324 engaging a toe 325 on the arm 318.

When the totalizer pinion 286 passes from nine to zero its long tooth rocks the arm 321 counter-clockwise and disengages the hook 324 from the arm 318, whereupon the spring 319 rocks said arm 318 clockwise. This lowers the pawl 317 so that it engages the next lower tooth on the pinion 316.

Prior to this time the bar 326 is lowered by a cam 327. There is a cam 327 and a bar 326 for each denomination of the totalizer and they are so arranged that the cams operate the bars in succession. After the pawl 317 has been lowered, provided a transfer has taken place, the bar 326 is raised, whereby the pawl, which engages the pinion 316 engaging the pinions 286 of next higher order than that which operates the arm 321, turns the pinion 316 thus adding one to said totalizer pinion 286 of next higher order.

The cams 327 are operated by a cam device (not shown herein but fully illustrated and described in the above mentioned parent case) which receives its movement from the main cam shaft 55.

*Totalizer engaging mechanism.*—After the slides 234 have been differentially positioned under the control of the various keys depressed in the several amount banks, and after the shafts 285, carrying the totalizers 286, have been positioned to select individual totalizers commensurate with the keys depressed in the "transaction", "department" and "clerks" key banks, the selected totalizers are rocked into engagement with the teeth 249 on the slides 234 so that as the latter are returned to their normal home positions, the amounts set up thereon are transferred to and accumulated upon the selected individual totalizers.

The mechanism for engaging the selected totalizers with the racks includes the previously described selecting and engaging bars 289 (Figs. 8, 12 and 18) and three lifter bars 330, 331 and 332 all identically alike. The lifter bars are guided in their vertical movement by the rod 307 and by a rod 333 extending between the frames 277 and 278. Each of the lifter bars has three slots 334 to receive the rear edges of the three selecting and engaging bars 289. A spring 335, attached to each of the lifter bars and to a stud on the back frame 275, holds all of the lifter bars in their lowermost position.

Only the lifter bar 330 (Figs. 11, 12 and 18) is directly lifted during adding operations to control the rocking of the plate selecting and engaging bar 289; the upward movement of the other two bars 331 and 332 being controlled by the selected position of the uppermost selecting and engaging bar 289 as will be hereinafter described. The purpose of the plurality of lifter bars will be discussed later in connection with an additional totalizer selecting mechanism of which these bars form a part. During totalizing operations each lifter bar is driven directly and independently in a manner which also will be explained in detail later. The lifter bar 330 (Figs. 11 and 13) has a notch engaging a laterally turned lip 337 on a pitman 338 bifurcated at its forward end to receive a sleeve 339 on the shaft 311. The pitman 338 also carries a roller 340 projecting into a cam race 341 in a disc 342 fast upon a split hub 343 (Figs. 3 and 13). This hub is clamped upon the sleeve 339 by a bolt so that the disc is rotatable with said sleeve.

Pitmans 346 and 247 (Figs. 8 and 10) have rollers 348 and 349 co-operating with cam races 350 and 351 in discs 352 and 353 respectively both of which are mounted on the sleeve 339 in the same manner as is the disc 342, that is by means of a split hub 343 (Figs. 3 and 13).

The rear end of each of the pitmans 338, 346 and 347 is supported by a rod 354 carried by a frame composed of arms 355, connected by bar 356, which arms are pivoted upon the shaft 311.

Each pitman 346 and 347 also has a flange 337 co-operating with a notch 336 in the lifter bars 331 and 332.

The two pitmans 346 and 347 function during total taking operations only, and will be later described, but attention is here called to the fact that when the total lever 78 is set in the adding position the parts will occupy the positions illustrated in Figs. 8, 10 and 11 in which the pitman 338 has its lug 337 in engagement with the notch 336 in the lifter bar 330, but the pitmans 346 and 347 have their lugs 337 withdrawn from the notches 336 in the lifter bars 331 and 332.

When the rod 354 is lifted all three pitmans will be rocked counter-clockwise swinging about the sleeve 339 as a pivot. Since the pitman 338 is connected to its associated lifter bar 330 this bar will be lifted and will rock the selecting and engaging bar 289 and shaft 281 of transaction totalizers to engage the selected transaction totalizer with the teeth 249 on the common actuating slide 234. The rocking of this upper plate 289 (Fig. 12) will under certain conditions act to elevate the lifter bars 331 and 332 to engage the departmental and clerks' totalizers with the common actuating slide as will be hereinafter described.

Figure 15:
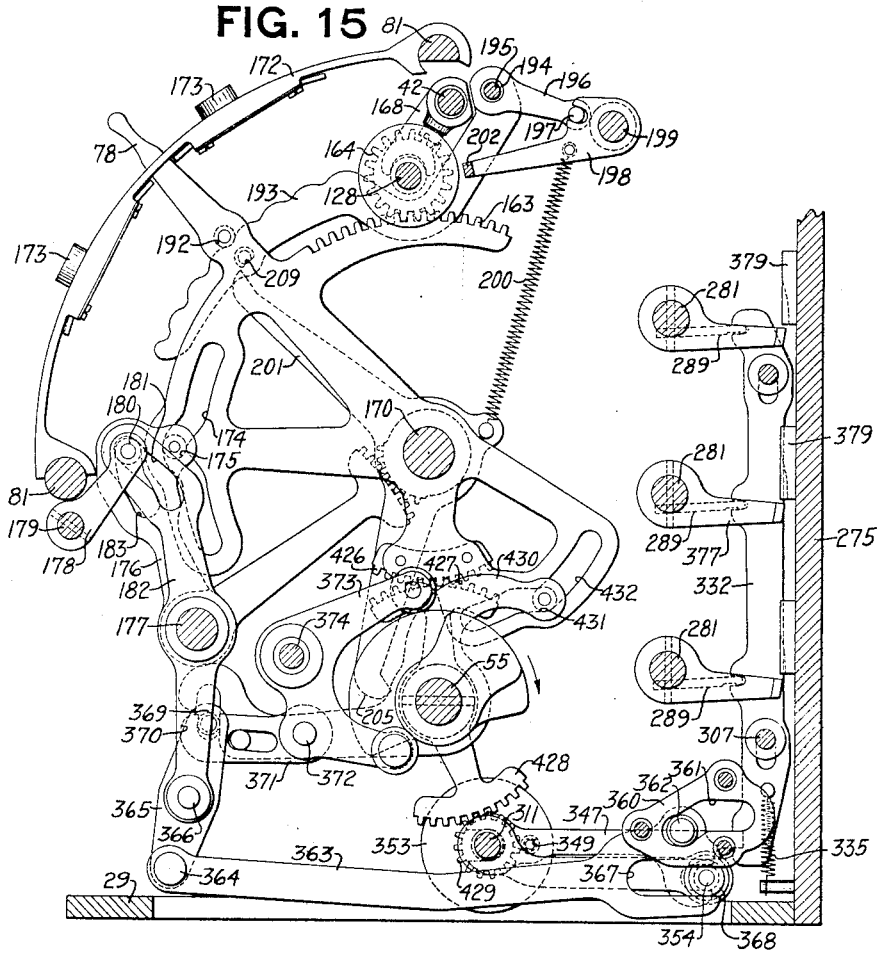
Fig. 15 is a section on line 15—15 of Fig. 3, looking in the direction of the arrows, and shows the connections between the totalizer engaging mechanism and the total lever.
Figure 16:
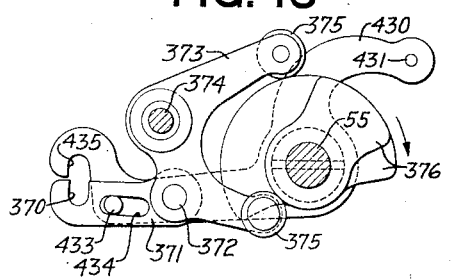
Fig. 16 is a detail of the totalizer engaging cams and lever.

Since the parts in Fig. 15 are shown in their adding positions, a description of the mechanism for lifting the rod 354 will be given with particular reference to this figure. A cam plate 360 is secured to the side frame 28. This plate has a groove 361 co-operating with a roller 362 on a link 363 pivoted at 364 to a lever 365. This lever 365 is pivoted upon a stud 366 on the lower end of the lever 182 which it will be remembered is pivoted loosely upon the shaft 177. The rear end of the link 363 has a slot 367 which receives a roller 368 on the end of the rod 354. The upper end of the lever 365 has a pin 369 engaged by a hook 370 (Fig. 16) of a link 371 pivoted on a stud 372 carried by a bell crank 373 which in turn is pivoted on a stud 374 on the frame 28. The bell crank 373 also carries two rollers 375 co-operating with a double plate cam 376 which is fast on the main cam shaft 55.

When the cam shaft 55 is rotated clockwise (Figs. 15 and 16) and the double plate cam 376 rocks the bell crank 373 clockwise which movement will through the link 371 rock the lever 365 counter-clockwise which pushes the link 363 rearwardly. As the link 363 moves in this direction its roller 362 being in the cam slot 361 causes the rear end of the link 363 to rise thereby moving the rod 354 upwardly thus raising the rear end of all three of the pitmans 338, 346 and 347. Since the pitman 338 is in engagement with the lifter bar 330 this bar will be raised and rock the transaction totalizer shaft 281 thus carrying the shaft 285 and the transaction totalizer 286 into engagement with the teeth 249 on the differential slides 234. As above stated, this takes place after the totalizers have been shifted laterally to select the particular totalizer to be actuated. After the amounts have been added to the totalizer, the cams 376 restore the parts to their normal positions.

Means is also provided for aligning the totalizer lines so that the pinions of the selected totalizer will be in correct position to engage the teeth 249. For this purpose an aligner arm 377 (Figs. 12 and 15) is secured to each of the shafts 281, so that when said shafts are rocked to engage the totalizer pinions with the racks 249 the outer end of the arms 377 will engage one of a series of notches 378 in plates 379 secured to the back frame 275. If one of the shafts 281 has not been slid to its exact lateral position the engagement of the aligner bar with its correct notch 378 will exactly position the shaft 281 and consequently exactly align the selected totalizer pinion 286 with the teeth 249.

As is usual in the art, there are provided totalizer pinions 286 for which no banks of amount keys are employed, these elements being of higher denomination and operated in adding operations only when transfers to them are necessary. Differential units like those controlled by the amount keys are provided to actuate these totalizer elements of higher denomination. During total and sub-total operations these higher order elements are used to position type carriers and indicator targets as has been fully illustrated and described in the parent application.

*Selecting devices for totalizer engaging mechanism.*—In prior machines where a plurality of totalizer lines were provided, each line containing a plurality of individual totalizers, such a construction being illustrated in a former patent issued to applicant No. 1,242,170 on October 9, 1917, the particular totalizers were selected by sliding the totalizer shaft but all the totalizer shafts were rocked into engagement with the differential mechanism at every operation of the machine. Consequently when it is desired to accumulate on but one totalizer in machines having two totalizer shafts, in some cases the only way the desired results could be accomplished was by removing the totalizer pinions from the totalizer shaft which it was not desired to operate. This construction manifestly permitted a very limited number of totalizer selection combinations.

In the present machine three sets of totalizers are provided and the mechanism for shifting the totalizer shaft to select various totalizers has heretofore been described in detail. The mechanism for rocking the totalizer pinions into engagement with the differential actuators has also been described in a general way with regard to the transaction totalizers. In addition to this engaging mechanism, however, a totalizer shaft selecting mechanism is provided with means for preventing or permitting as is desired 1, 2 or all three of the sets of totalizers to be rocked into engagement with the differential mechanism simultaneously.

Due to this construction totalizer controlling keys may be pressd in combination, but only one totalizer selected thereby to accumulate the amount, due to the totalizer shaft selecting mechanism.

The operation of the totalizer shaft selecting devices can be best understood by Fig. 18 which is a diagrammatic illustration of this mechanism together with its co-operation with the control banks of the machine. The totalizer selecting and engaging bars 289 have high spots 380 and low spots 381. The positions and extents of these high spots 380 and the low spots 381 made upon the bars 289 have been arranged to carry out the particular functions and objects which the system of a certain market requires. Applicant, however, does not wish to be limited to the particular arrangement of high and low spots as illustrated in Fig. 18 as they may be changed to fit various systems which this machine may be used for. Due to the construction of the machine release mechanism it is necessary to depress three totalizer selecting keys, during adding operations, but it is not desired that the amounts should always be accumulated on three individual totalizers.

The present machine has its bars 289 so formed that the amount of the "cash" sales is added upon the individual "transaction" totalizer, whatever "departmental" totalizer is selected and whatever "clerks" totalizer is selected. The amounts of the "received on account" sales are added upon the individual "transaction" or "received on account" totalizer, and the selected "clerks" individual totalizer but not upon the selected "departmental" totalizer; and the amounts of "charge" transactions are added upon the individual "transaction" or "charge" totalizers and the selected "departmental" totalizer but not upon the selected "clerks" totalizer. In this way each "clerk's" totalizer will accumulate all "cash" and "received on account" transactions that he makes so that the correct amount of cash he should have in his cash drawer may be determined. No cash drawers or operating mechanism therefore are shown in the present machine, but it is to be understood that where there are a plurality of clerks, a plurality of cash drawers are to be provided, as is well known in the art and illustrated and described in the Letters Patent of the United States Nos. 616,866 and 760,724 issued to W. S. Bockhoff on December 27, 1898, and May 24, 1904, respectively.

Each individual departmental totalizer in this instance will show a total amount of sales of this commodity, whether cash or charge. The lifter bar 330 co-operates with the selecting and engaging bar 289 fast upon the shaft 281 appropriate to the group of transaction totalizers. This transaction bar 289 is best illustrated, in one embodiment of the invention, in Fig. 18 and for convenience the different co-operating points of the transaction bar 289 are marked with the different points of co-operation of said bar with the lifting bar 330 by marking on the surface of the bar 289 the point thereof which will be in alignment with the lifter bar 330 upon the operation of the various transaction keys 75. Fig. 18 shows the three bars 289 in three positions of adjustment. The three bars 289 for the transaction, department and clerks banks of keys are shown in the left hand tier as in the normal zero position, in which the parts might be positioned if it were possible to operate the machine with no keys depressed, under which condition all of the actuators would be in the zero position.

The next tier of illustrations shows the position assumed by the selecting and engaging bars 289 when the "cash" key of the transaction bank, the "meat" key of the department bank and the "D" key of the clerks' bank have been depressed. In the last or right hand tier of illustrations the transaction bar 289 is shown in the position which it assumes when the "received on account" key is depressed; the department bar 289 is shown in the position it will assume when th "fish" key is depressed and the clerks bar is shown in the position it will assume when the "B" is depressed.

Referring to the left hand tier of details Fig. 18 it will be noted that none of the lifter bars 330, 331 and 332 is in operative engagement with any of the three bars 289 because said bars are formed with notches 381 so that the notches 334 of the bars 330, 331 and 332 will not engage the edges of the selecting and engaging bars 289. Referring to the second tier of the details, when the rear end of the pitmans 338, 346 and 347 are raised by the elevation of the rod 354, the pitman 338 by reason of its engagement with the lifter bar 330 will effect a rocking movement of the shaft 281 by lifting the outer edge of the transaction totalizer selecting and engaging bar 289 by the engagement of the upper notch 334 of the lifter bar 330 with the projection or high spot 380 on that bar. When the transaction totalizer selecting and engaging bar 289 is in the position shown in the second tier it will be noted that additional projections on that particular bar 289 are also in a position to be operatively engaged by the lifter bars 331 and 332. Consequently when the lifter bar 330 acts to lift the outer edge of the transaction totalizer selecting and engaging bar 289, said bar 289 elevates the lifter bars 331 and 332 by reason of the lugs 380 which project into the notches of the lifter bars 331 and 332. Thus it is seen that notwithstanding the fact that the pitmans 346 and 347 (Figs. 8 and 10) are ineffective to elevate the lifter bars 331 and 332, they are elevated by the uppermost bar 289.

By referring to the middle and lower details of the second tier, it will be noted that the lifter bar 331 then engages lug 380 on the department bar 289 at the point marked "meat" and consequently when the lifter bar 331 is elevated the shaft 281 of the department totalizer will be rocked. Furthermore, the lifter bar 332, it will be noted, by referring to the lower details of the second tier will be in engagement with the clerks' bar 289 and consequently will rock the shaft 281 of the clerks' totalizers when the lifter bar 332 is raised as above described.

By referring to the right hand tier of details (Fig. 18), when the transaction bar 289 is moved to the position represented by "received on account" a notch 381 is brought to a point in alignment with the lifter bar 331 while the lug 380 will be in co-operative alignment with the lifter bar 332. Consequently when the machine is operated with the "received on account" key depressed, the lifter bar 330 will rock the shaft 281 to engage the transaction totalizer, but by reason of the notch 381 which is then in alignment with the lifter bar 331, said lifter bar will not be elevated and consequently the department totalizer will not be engaged with the actuators regardless of which one has been positioned for operation, the positioning being necessary to adjust the connections between the actuator for the department banks and the indicating and printing mechanisms, which mechanisms are illustrated and described in the parent case. The lifter bar 332, however, will be elevated and consequently engage the properly positioned clerk's totalizer with the actuators.

From the above description, it will be understood that whether or not a totalizer selecting and engaging bar 289 is rocked counter-clockwise depends upon whether or not there is a notch 381 in the rear edge of the bar opposite the associated notches 334 in the lifter bars. The selection and engagement of the totalizers for adding items on one, two or three totalizers at a time depends upon the system which it is desired the machine should carry out. As a consequence, and as above-mentioned, the bars 289 have their edges shaped so as to carry out the special functions desired of the machine. The position of the three lifter bars 330, 331 and 332 remains constant so far as their vertical plane is concerned, whereas the three bars 289 are moved longitudinally in a horizontal plane different distances determinable by the keys depressed in the "transaction." "departmental" and "clerks" key banks as has already been described in detail.

Under certain positions of adjustment of the total lever 78 the shaft 311 (Figs. 3, 8, 10, 11 and 15) is rotated, thereby adjusting the cams 342, 352 and 353 to positions according to the position of adjustment of said lever 78. If the lever 78 is moved from the transaction position to the department position, either "read" or "reset," all three cams 342, 352 and 353 will be rotated a short distance, thereby withdrawing the pitman 338 from engagement with the lifter bar 330 and moving the pitman 346 rearwardly so as to engage it with the lifter bar 331. If the total lever 78 is moved to a position representing "clerks" in either "read" or "reset" positions, the cam 353 will be brought to a position where the pitman 347 is moved rearwardly to engage the lifter bar 332, while the other two pitmans 338 and 346 will be shifted forwardly so that they will not be in engagement with the lifter bars 330 and 331. When the total lever 78 is moved to the transaction position, either "read" or "reset," the cams will be in the same position as represented by the adding position in which the pitman 383 will be moved rearwardly and in engagement with the lifter bar 330 and the pitmans 346 and 347 will be out of engagement with the lifter bars 331 and 332 respectively.

As will be hereinafter described when the total lever 78 is in either the transaction, department or clerks position, the one bank of keys appropriate to those positions will be operable and consequently the actuators for the other banks will be left in zero position. At such a time the bars 289 of the two banks of keys which remain inoperative will be moved to zero position where a notch 381 will be presented to the lifter bars appropriate to the two inoperative banks. Thus it is seen that whenever the total lever 78 is shifted out of its "add" position, only one of the lifter bars can be lifted during the operation, and for this reason a lifter bar is provided for each selecting and engaging bar 289.

*Indicating and printing mechanisms.*— The indicating and printing mechanisms are neither shown nor described in this divisional application because they form no part of the present invention described and claimed in this case. However, the mechanisms shown and described in this case are particularly adapted to control and operate indicating and printing mechanisms such as those fully illustrated and described in the parent application, Serial No. 299,112.

*Total and sub-total.*—In order to allow sufficient time for the selection and engagement of any desired totalizer with the actuating racks when a rotal or sub-total is to be taken, the main cam shaft 55 is given two continuous rotations in total and sub-total operations instead of one as is the case in adding operations.

The mechanism for controlling the two rotations of the cam shaft is practically the same as that illustrated and described in the previously mentioned Fuller Patent No. 1,242,170 and therefore it is not necessary to go into a full detailed description herein.

Fast upon the previously described shaft 179 (Fig. 2) is an arm 390 connected by a link 391 to a lever 392 pivoted on the stud 152. Pivoted to the lever 392 is a link 393 having a slot 394 by means of which the link 393 is guided in its movements on the stud 68. The link 393 has two pins 395 which engage a toe 396 in a coupling slide 397 which surrounds the stud 68 and lies in a groove in a disc 398. The small end of the slide 397 is adapted to enter either of two notches 399 in the gear 67. The link 393 carries a roller 400 which normally rests in a notch 401 in the disc 398. This disc 398 has a cam race 402 with which the roller 400 co-operates during total and sub-total operations as will be described later.

When the total lever 78 (Fig. 15) is moved either up or down to set the machine for sub-total or total operations, the shaft 179 (Fig. 2) is rocked clockwise.

When this movement of the shaft 179 occurs, the link 393 is moved toward the left (Fig. 2) in the direction of its length so as to cause the roller 400 to engage the cam race 402 and at the same time position the toe 396 in the notch 399 of the gear 67. This slide 397 therefore acts as a coupler between cam disc 398 and the gear 67 so that when the gear 67 is rotated, during totalizer operations, the cam disc 398 and cam 402 will be rotated also.

Figure 2:
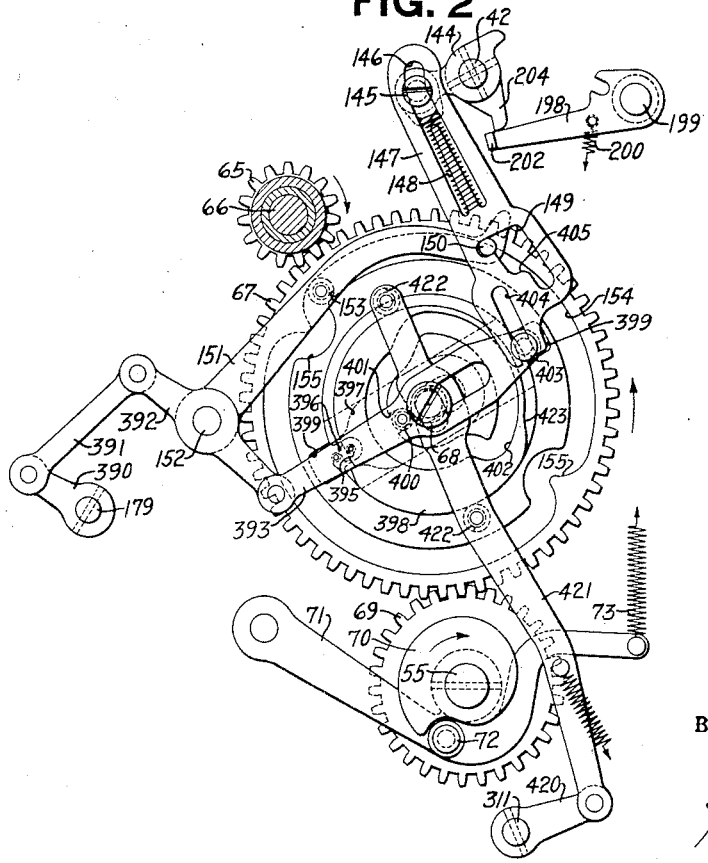
Fig. 2 shows the control of the driving mechanism for adding, sub-total and grand-total operations and a portion of the key release mechanism.

In adding operations it will be remembered that this gear 67 is given one-half a rotation but during total and sub-total operations said gear is given one full counter-clockwise rotation whereby the gear 69 gives the cam shaft 55 two continuous clockwise rotations as viewed in Fig. 2.

As previously stated, the cam race 154 during adding operations, by means of the arm 151 and link 147 causes the shaft 42 to be rocked counter-clockwise to release the keys. Since in totaling operations the gear 67 is given a full rotation, the arm 151 will be operated twice and therefore means is provided for preventing the release of the keys at end of the first half rotation of the gear 67.

This means includes a stud 403 (Fig. 2) which engages a slot 404 in the link 147. When the link 393 is moved toward the left, by the cam 402, the link 147 is rocked clockwise with the stud 145 as the fulcrum. This movement is sufficient to withdraw the offset of the opening 149 from co-operation with the pin 150, so that as the arm 151 is moved clockwise the pin 150 will move idly in the longest portion of the slot 149 the first time said arm is rocked clockwise by the cam 155. Since the pin 150 moves idly in the long portion of the slot 149 the shaft 42 is not rocked counter-clockwise (Fig. 2) to release the keys, but allowed to remain in the position to which it was rocked by the spring 148, when the machine was released for operation.

As previously described, the pin 58 (Fig. 4) through its engagement with the link 56 rocks the lever 37 clockwise to stop the motor at the end of the first rotation of the shaft 55 during adding operations, after which the arm 41 is rocked clockwise to engage the roller 39 and maintain the lever 37 in its locking position.

Since the shaft 42 and consequently the arm 41 are not rocked clockwise at the end of the first rotation during total or sub-total operations, even though the link 56 is moved upwardly by the pin 58 and thus rocking the locking lever 37 in a clockwise direction, said locking lever will not be held in this position because its spring 43 will immediately cause it to be again rocked in a counter-clockwise direction (the time between the disengaging of the pin 58 from the bottom of the link 56 and the engaging of the locking lever 37 with the clutch to stop the motor is sufficient for the spring 43 to rock the lever as just mentioned) and therefore the clutch instead of receiving two rotations as in adding operations will receive four rotations whereby the cam shaft 55 through the gear 53 is given two complete rotations which as above mentioned causes the large gear 67 (Fig. 2) to receive one full rotation during total and sub-total operations.

As the gear 67 starts the last half of this complete rotation, the link 393 is moved rearwardly or to the right (Fig. 2) by the cam race 402, so that as the arm 151 is operated the second time, the pin 150 will engage with the middle step 405 of the slot 149 and therefore the link 147 will be moved downwardly to rock the shaft 42 to release the keys just before the end of the second operation during totaling. Just before this shaft 42 is rocked as just stated, the link 56 (Fig. 4) is moved upwardly by the pin 58 to rock the lever 37 clockwise and therefore when the shaft 42 and arm 41 rock clockwise said arm engages the roller 39 on the lever 37 and holds it in the proper position so that said lever will engage the clutch mechanism and stop the motor.

When the shaft 179 is rocked clockwise (Fig. 6) by the movement of the total lever 78, the rod 188 is moved down in front of the tail 189 of the arm 86 which it will be remembered supports the flexible detent 83. This of course prevents any depression of any of the amount keys 74 when the total lever has been moved out of its adding position.

During adding operations when a key in an amount bank is depressed the zero stop pawl 91 in that bank is rocked to the ineffective position by means of this arm 86 engaging the pin 90 as has been previously described. During totaling operations it is also necessary to have the zero pawl 91 moved to the ineffective position so that the differential mechanism may be controlled by the amounts which are on the totalizer wheels, and therefore, during the first operation of the cam shaft 55 the latches are all disconnected from their drivers in the zero position, but as the shaft 179 is rotated still farther by the cam race 402, which moves the link 393 forward to accomplish this extra movement of the shaft 179, the rod 188 engages a toe 406 integral with the zero stop pawl 91 and causes said pawl to be rocked counter-clockwise (Fig. 6) to the ineffective position so that during the second rotation of the cam shaft the latches are not disconnected in the zero position but travel until disconnected by the engagement of the long tooth 320 of the totalizer pinions 286 with the totalizer zero stop pawl which will be described later.

The totalizer zero stop pawls just mentioned are shown particularly in Fig. 5 which cause the differential mechanisms associated with the amount banks to be set to a position commensurate with the amount which is upon each of the totalizers when taking a total or sub-total. There are three zero stop pawls 410 (Fig. 5) for each amount bank pivotally mounted upon a link 411 which is slidably mounted upon the shafts 217 and 235. The lower end of the link has a pin 412 engaging an arm 413 fast upon the previously described shaft 311. The zero stop pawls 410 are held in their normal position by a spring 414 stretched between the link 411 and a link 415 which is pivotally connected to the rear end of each of the pawls 410. The lower end of the link 415 engages a shoulder 416 on the link 411 which prevents the pawls 410 from being oscillated beyond the normal position. Integral with the center pawl 410 is an arm 417 having a toe 418 which is adapted to co-operate with teeth 419 which are integral with the differential lever 236. Secured to the end of the shaft 413 is an arm 420 (Fig. 2) which has pivotally connected thereto a link 421 which carries two rollers 422 which co-operate with a cam surface 423 on the disc 398.

When the disc 398 is rotated counter-clockwise (Fig. 2) it raises the link 421 and rocks the shaft 311 counter-clockwise as viewed in Fig. 2 and clockwise as viewed in Fig. 5. This movement of the shaft 311 through the arm 413 raises the link 411 thus positioning all of the zero stop pawls 410 whereby they will be set to co-operate with the long tooth 320 of each of the totalizer pinions 286.

As above stated the zero stop pawls 91 for the amount banks cause the latches to break in the zero position during the first rotation of the cam shaft 55 and consequently the differential slides 234 are held in their normal position during the first rotation at which time the selected totalizer is engaged with the teeth 249 as will be hereinafter described.

However, during the second operation of the cam shaft 55 the zero stop pawls as above described, are oscillated so that the differential plates 231 and levers 236 may be moved beyond the zero position a distance depending upon the position in which the long tooth 320 is located previous to the taking of a total or sub-total. After the totalizer wheels 286 of a selected totalizer have been engaged with the teeth 249, the differentially movable plates 231 and levers 236 are rotated clockwise (Fig. 6) and the differential slides 234 are thereby moved downwardly thereby causing the totalizer wheels to be rotated in a counter-clockwise direction until the long tooth 320 of each totalizer wheel strikes its zero stop pawl 410. When this occurs said pawls will be oscillated counter-clockwise (Fig. 5) whereby the arms 417 are rocked likewise to engage one of the teeth 419 of the differentially movable levers 236 thereby causing both the lever 236 and the plate 231 to be stopped whereby the latch pawls 241 are rocked counter-clockwise (Fig. 6) and engage the notched plates 245 thus causing slides 234 to stop.

When the totalizer pinions 286 are rotated as just described until the long tooth 320 strikes the pawl 410, the pinions are then in their zero position. If a total operation is being taken the pinions are disengaged from the teeth 249 of the differential slides 234 before said slides are moved to their normal position thereby leaving the totalizer pinions in their zero position. However, during a read or sub-total operation, the totalizer pinions are held in engagement with the teeth 249 until the slides 234 are returned to their normal position whereby the amount which was taken from the totalizer pinions is put back upon them so that when they are disengaged from the teeth 249 they will not set at zero but will have the same amount thereon as before said read or said sub-total operation is taken. The mechanism for controlling the timing of the disengagement of the totalizer wheels as just described is automatically controlled by the setting of the total lever 78.

The mechanism for controlling the engagement and disengagement of the totalizer lines for total operations will be described first after which the mechanism for controlling the engagement and disengagement of the totalizers during a read or sub-total operation will then be described.

The total lever 78 has secured thereto a segment 426 (Figs. 3 and 15) which meshes with a segment 427 loose on the cam shaft 55. Integral with the segment 427 is a segment 428 meshing with a gear 429 which is secured to the previously described sleeve 339, which has clamped thereto the three cam discs 342, 352 and 353 which co-operate with pitmans that are used to engage with the lifter bars 330, 331 and 332 for rocking the totalizer lines in the manner previously described.

By referring to Fig. 1 it will be seen that the "read" position of the transaction, department and clerks totalizers is above the "add" position and the "reset" position for the transaction, department and clerks totalizers is below the "add" position. If the total lever 78 is moved counter-clockwise (Fig. 15) for a "reset" operation until its position is opposite the word "clerks" it will through the segments 426, 427 and 428 and the pinion 429 rotate all three discs 342, 352 and 353 counter-clockwise as viewed in Figs. 8, 10 and 11. This rotation of the discs causes the pitman 338 by reason of the cam slot 341 to be moved to the left (Fig. 11) thus withdrawing its lug 337 from the lifter bar 330. The cam race 350 in the disc 352 causes the pitman 346 (Fig. 8) to be moved first to the right and then to the left so that it will assume the position in which it is shown in Fig. 8. The cam 351 (Fig. 10) will cause the pitman 347 to be moved to the right whereby its lug 337 will enter the notch 336 in the lifter bar 332.

As previously described, during adding operations the rod 354 is elevated to engage at least one of the sets of totalizers with the teeth 249 on the differential slides 234 and it would also cause either two or three sets of totalizers to be engaged with said slides provided the selecting and engaging bar 289 was shifted to engage all three lifter bars 330, 331 and 332, which bar 289 is under the control of the keys in the transaction bank. However, during totalizing operations whether taking a total or sub-total, only one totalizer line is rocked into engagement with the actuating slide 234 at a time, as will be readily understood from the above description of the discs 342, 352 and 353 and the pitmans 338, 346 and 347.

Before the totalizer line has been rocked into position, the totalizer for any desired clerk on this line may be selected by the depression of any key in the clerks bank which controls the differential mechanism and disconnects the latch so that the rack teeth 270 on the slide 269 will rotate the drum cam 293 (Fig. 12) thereby shifting the shaft 281 and bar 289 so that the proper totalizer will be engaged with the teeth 249 on the differential slide 234.

As before stated, the timing for the engaging and disengaging of the totalizers with the actuating racks for a total and subtotal operation is different. The means for controlling this differential timing includes a bell crank 430 (Figs. 15 and 16) the upper arm of which carries a roller 431 engaging a slot 432 in the total lever 78. The lower arm of the bell crank has a pin 433 engaging a slot 434 in the previously described link 371. The lower arm of the bell crank 430 also has a hook 435 adapted to co-operate with the pin 369 on the lever 365.

When the total lever 78 is moved counter-clockwise (Fig. 15) for a reset or total operation, the bell crank 430 by means of the slot 432 is oscillated counter-clockwise whereby the hook 435 engages the pin 369 on the lever 365. This same movement of the bell crank 430 by means of the pin 433 in slot 434 disengages the hook 370 from the pin 369. When the parts are in this position and the cams 376 rock the bell crank 373 there will be no movement of the lever 365 and therefore link 363 will not be moved to the right and the totalizer line will not be rocked.

As previously described the shaft 179 (Figs. 2 and 15) is rocked clockwise, first by the movement of the total lever 78 itself, and second by the movement of the cam race 402. The shaft 179 is then rocked counter-clockwise by the cam race 402 and then finally still farther counter-clockwise to its home position when the total lever 78 is moved to its home position. The first clockwise movement of the shaft 179 does not effect any movement of the arm 182 and its integral arm which carries the stud 366 to which the lever 365 is pivoted. This is because the upper portion of the slot 181 is concentric with the center of the shaft 179. However, during the clockwise movement of the said shaft 179 which is caused by the cam race 402, the arm 182 and its integral arm are rocked counter-clockwise which causes the lever 365 to be rocked counter-clockwise (Fig. 15) with the pin 369 as the pivot point. At this time this pin 369 becomes the pivot because the hook 435 of the bell crank 430 is hooked over said pin during the total taking operation and at the same time the link 371 has been disconnected from the pin 369 so that the cams 376 have no effect whatever upon the lever 365.

The counter-clockwise movement of the lever 365 which is occasioned by the cam 402 causes the link 363 to be moved to the right (Fig. 15) so that its roller 362 will engage the upper horizontal portion of the slot 361 in the cam plate 360 thus raising the rod 354 to rock the selected totalizer into engagement with the teeth 249 of the differential slide 234. The clockwise movement of the shaft 179 by the cam race 402 does not rock the arm 176 (Fig. 15) because the lower portion of the slot 183 in said arm is concentric with the shaft 179 and consequently the arm 176 and the roller 175 will not be moved by the action of the roller 180 as it rocks the arm 182 counter-clockwise.

As the cam race 402 rocks the shaft 179 counter-clockwise it also causes the arm 182 to be rocked in a clockwise direction whereby the lever 365 is moved about its pivot point 369 so that the link 363 will be drawn forwardly and its roller 362 will again engage the lower portion of the slot 361 which effects the disengaging of the selected totalizer from the teeth 249 on the differential slide 234. As the total lever 78 is moved back to its normal adding position the bell crank 430 is rocked clockwise which disengages its hook 435 from the pin 369 and engages the hook 370 of the link 371 with said pin 369.

During a sub-total or "read" operation when the total lever 78 is moved in a clockwise direction (Fig. 15), the slot 432, being concentric with the center of the shaft 170, causes no movement whatsoever of the bell crank 430. Therefore when the cams 376 (Fig. 16) are rotated clockwise the bell crank 373 is rocked clockwise whereby the link 371 is moved forwardly to rock the lever 365 about its pivot 366 in a counter-clockwise direction to move the link 363 so that its roller 362 will engage the upper horizontal portion of the slot 361 thus rocking the selected totalizer into engagement with the teeth 249 on the differential slide 234.

After the roller 362 has been moved to engage the selected totalizer, as just described, the cam race 402 (Fig. 2) through the roller 400, link 393 and connections to the shaft 179 rocks said shaft clockwise thereby rocking the arm 182 in a counter-clockwise direction whereby the lever 365 is rotated counter-clockwise about the pin 369 which causes the link 363 to be moved still farther towards the rear of the machine whereby the roller 362 is moved to the rear horizontal portion of the slot 361. Just before the roller reaches this rear portion the cams 376 cause the bell crank 373 (Fig. 16) to be rocked counter-clockwise whereby the link 371 is moved rearwardly and rocks the lever 365 about the pivot 366 (Fig. 15) which causes the link 363 to be moved forwardly. This last mentioned forward movement of the link 363 causes the roller 362 to again be positioned in the forward part of the upper horizontal portion of the slot 361.

Due to the fact that the cams 376 are given two continuous rotations in total and sub-total operations and also due to the fact that in sub-total or "read" operations the link 371 is not disengaged from the totalizer engaging lever 365, the cam race 402 (Fig. 2) is so timed that as the bell crank 373 is rocked in a counter-clockwise direction the second time, said cam race 402 causes the arm 182 to be rocked in a clockwise direction. The forward movement of the link 371 and the simultaneous movement of the arm 182 neutralizes the movement of the link 363 so that it will remain stationary during these two movements whereby the roller 362 will be left in the forward part of the upper horizontal portion of the slot 361 thus maintaining the selected totalizer in engagement with the teeth 249 on the differential slide 234.

In this way it is possible to hold the selected totalizer in engagement with the actuators until said actuators have been returned to their normal positions whereby the amount taken from the totalizer is put back upon it after which during the later part of the second rotation of the cam shaft 55 the bell crank 373 is again oscillated in a counter-clockwise direction whereby the link 371 is moved rearwardly thus oscillating the lever 365 about its pivot 366 which causes the link 363 to be moved forwardly to its normal home position thereby moving the roller 362 from the upper horizontal portion of the slot 361 to the lower portion to the position shown in Fig. 15 whereby the totalizer is rocked out of engagement with the actuating rack.

*Operation.*—To set up an item on the machine the amount keys 74 must be depressed first, then a key 75 in the transaction bank, then a key 76 in the department bank and finally a key 77 in the clerks' bank. Of course the total lever 78 must be set in its "add" position in order that the operator may depress the keys as just stated.

Upon depression of the clerk's key 77 the machine is released for operation and if it be motor driven, the cam shaft 55 is given one complete rotation by means of the gearing shown in Fig. 4. If the machine is to be operated by hand then the cam shaft 55 is given a complete rotation by means of the gearing shown in Fig. 2. During the rotation of the cam shaft 55 the shaft 170 and the driving segments 230 are rocked first clockwise then counter-clockwise (Fig. 6).

The clockwise movement causes the differential plate 231 and lever 236 to be moved clockwise until the flange 237 strikes the inner end of the depressed key which causes the differential plate 231 and lever 236 to be disconnected from the driving segment 230. This causes the differential slide 234 to be set in the position commensurate with the value of the key which has been depressed. After the slides have been set as just mentioned, the selected totalizer pinions 286 are moved into engagement with the teeth 249 so that upon the counter-clockwise movement of the shaft 170 and segments 230, during which time the differential plates 231 and levers 236 are restored to their home positions by means of the pins 251, the racks 249 are restored to normal, thereby accumulating upon the particular totalizers which have been engaged therewith the amount which has been set upon the key board. After the slides 234 have been restored to their home positions and the amount added into the totalizer pinions said pinions are disengaged from the teeth 249.

In total and sub-total operations the amount keys 74 are locked against depression by means of the rod 188 (Fig. 6) which rod it will be remembered is rocked by movement of the total lever 78. During the first rotation of the cam shaft 55 in totalizing operations this rod 188 holds the zero stop pawls 91 in their normal positions thereby causing the latches 241 to be disconnected from the driving segments 230 in the zero position to make it possible for the totalizers to be rocked into mesh with their differential slides so that a total or sub-total may be taken therefrom.

In totaling operations instead of being compelled to depress all three keys of the normal adding release banks which are the keys 75, 76 and 77, only one is made to release the machine through shifting of the sleeve 131. In other words if the total lever 78 is set so that it will be opposite the word "clerks" then any clerk's key 77 will release the machine, and if said lever is in a position opposite the word "dept." any of the departmental keys 76 will release the machine. The same is true if the total lever 78 is set opposite the "trans." position then any of the transaction keys 75 will release the machine. The shifting of the sleeve 131 is caused by the gear segments 163 gear 164 (Fig. 15) and drum cam 165 (Fig. 14).

While the form of mechanism herein shown and described is admirably adapted to fulfill the objects primarily stated, it is to be understood that it is not intended to confine the invention to the one form or embodiments herein disclosed, for it is susceptible of embodiments in various forms, all coming within the scope of the claims which follow.

What is claimed is:

1. In a machine of the class described, the combination of plurality of sets of totalizers, actuating means common to all of said totalizers, setting means for each set of totalizers for bringing any desired one of each of said sets of totalizers into operative alignment with the common actuating means, means for operatively engaging the positioned totalizers with the common actuating means, and means associated with one of said sets of totalizers and positioned simultaneously therewith for actuating the engaging means for the others of the sets of totalizers.

2. In a machine of the class described, the combination of a plurality of totalizers of one class, and a totalizer of another class, actuating means common to all of said totalizers, supporting means for the totalizers of the first class adjustable to bring any desired one of said totalizers into operative alignment with said common actuating means, means appropriate to the totalizers of each class for engaging the totalizers with the common actuating means, and means carried by the supporting means of the totalizers of the first class for determining the effectiveness of the engaging means of the totalizer of the other class.

3. In a machine of the class described, the combination of a plurality of totalizers of one class and a plurality of totalizers of another class, the totalizers of each class being independently supported, actuating means common to the totalizers of both classes, means for selecting the totalizer of each class to be operated and means associated with the totalizers of each class for engaging the selected totalizers with the common actuating means, the engaging means of one class depending for its effectivity upon the selection of the totalizers of the other class.

4. In a machine of the class described, the combination of a plurality of sets of totalizers, the totalizers of each set being mounted in axial alignment, actuating means common to all of the sets of totalizers, setting means for each of said sets of totalizers for bringing any desired one of each of the sets of totalizers into operative alignment with the said common actuating means, means including notched bars appropriate to each of said sets of totalizers for engaging the positioned totalizer with the common actuating means, and means rigidly connected to the totalizers of one set and adapted to cooperate with said bars for determining the effectivity of the engaging means of the other sets of totalizers.

5. In a machine of the class described, the combination of a plurality of sets of totalizers, the totalizers of each set being mounted in axial alignment, supporting means for the totalizers of each set, actuating means common to all of the sets of totalizers, setting means for adjusting the supporting means of each set of totalizers for bringing any desired one of each of said sets of totalizers into operative alignment with the common actuating means, means for moving the supporting means for the totalizers to engage the selected totalizers with the common actuating means, and means including a member having projections to cooperate with the moving means associated with one set of totalizers, said member being carried by the supporting means of that set of totalizers, said member also cooperating with the moving means of the other sets for determining the effectivity of the engaging means of the remaining sets of totalizers.

6. In a machine of the class described, the combination of a plurality of totalizers of one class, a totalizer of another class, actuating means common to all of said totalizers, means for adjusting said plurality of totalizers to bring any desired one of the same into cooperative relation with the common actuating means, means for engaging a selected totalizer with said common actuating means, and connections intermediate said plurality of totalizers of the one class and the totalizer of the other class whereby the latter will be engaged with the common actuating means when certain of the totalizers of said plurality are engaged with said actuating means.

7. In a machine of the class described, the combination of a plurality of sets of totalizers, actuating means common to the totalizers of all sets, means for adjusting all of said sets of totalizers to bring certain ones of the same into cooperative relation with the common actuating means, means for engaging the positioned totalizer of one set with the actuating means, and connections intermediate the sets of totalizers for engaging the positioned one of another set of totalizers with the common actuating means when certain of the totalizers of the first set are engaged with the said actuating means.

8. In a machine of the class described, the combination of a plurality of sets of totalizers, supporting means for each of said totalizers, actuating means common to all of the totalizers, means for adjusting the supporting means of each set to bring any desired one of the totalizers of each set into position to be actuated by the common actuating means, means for moving the supporting means for one of said sets of totalizers to engage the positioned totalizer of that set, and connections intermediate the supporting means of the sets of totalizers for moving the supporting means of another set of totalizers to engage the selected totalizer of that set with the common actuating means when certain ones of the totalizers of the first set are selected for operation.

9. In a machine of the class described, the combination of a plurality of sets of totalizers, of actuating means common to all of said totalizers, means for adjusting said sets of totalizers independently for bringing any desired one of each of said sets into position to be operated by said common actuating means, connections appropriate to each of said sets of totalizers for engaging the selected totalizer with said common actuating means said connections involving parallel bars, a differentially adjustable member having a normal position and a series of positions to which it may be adjusted, and connections controlled thereby for rendering said engaging connections effective singly when said adjustable element is in one of its positions of adjustment.

10. In a machine of the class described, the combination of a plurality of sets of totalizers, means for adjusting said sets of totalizers to bring any desired one of each of said sets to a position to be actuated, actuating means common to all of the totalizers, a main operating device, a series of engaging connections each appropriate to one of said sets of totalizers, for engaging the selected totalizers with the common actuating means, one of said engaging connections being normally in condition to be operated to engage the selected totalizer of its appropriate group upon an operation of the main operating device, a differentially adjustable element having a normal position and a plurality of positions of adjustment, and connections controlled by said adjustable element for holding the normally effective engaging connections in effective condition when said adjustable element is in its normal position but disabling said normally effective connection and enabling any desired one of the normally ineffective connections when said adjustable element is in one of its positions of adjustment.

11. In a machine of the class described, the combination of a plurality of sets of totalizers, a supporting frame for each of said sets of totalizers, actuating means common to all of said totalizers, means for adjusting the supporting frames to bring any desired totalizer of each set of totalizers into position to be actuated by said common actuating means, a notched plate carried by each of said supporting frames, a main operating device, connections intermediate the main operating device and the notched plate of one of said sets for moving a positioned totalizer of that set into operative engagement with the common actuating means, and connections intermediate the notched plate of said last mentioned set of totalizers and the notched plates appropriate to the remaining set of totalizers whereby the selected totalizer of said remaining sets will be engaged with the common actuating means when certain of the totalizers of said first mentioned set are in a position to be actuated.

12. In a machine of the class described, the combination of a totalizer, an actuator therefor, camming means for engaging said totalizer with the actuator during adding operations, and a second camming means for engaging the totalizer with said actuator during resetting operations, both of said camming means cooperating to engage the totalizer with the actuator during reading operations.

13. In a machine of the class described, the combination of a totalizer, an actuator therefor operable both to actuate the totalizer to enter amounts thereon and to reset said totalizer, operating connections for engaging said totalizer with the actuator at different times during the operating stroke of the latter, a camming member for actuating said operating connections to engage the totalizer with the actuators during adding operations, and a second camming member for engaging the totalizer with the actuator during a resetting operation.

14. In a machine of the class described, the combination of a totalizer, an actuator therefor operable to actuate said totalizer to add amounts therein during adding operations, said actuator being operable also to reset the totalizer to zero either permanently or temporarily, a camming member operable to engage said totalizer with the actuator during adding operations, and a second camming member for engaging the totalizer with the actuator when said totalizer is to be permanently reset, said two camming members cooperating to engage the totalizer with the actuator when said totalizer is being reset temporarily.

15. In a machine of the class described, the combination of a totalizer, an actuator therefor, operating connections for engaging the totalizer with the actuator at different times in the operation of the machine depending upon the particular conditions of operation, a camming member for actuating said operating connections under one condition of operation, and a second camming member for engaging the totalizer with the actuator under a different condition of operation, said camming members cooperating to engage the totalizer with the actuator under a still further different operating condition of the machine.

16. In a machine of the class described, the combination of an actuator, a totalizer adapted to be operated thereby, operating connections for engaging the totalizer with the actuator, two camming members effective separately during certain operations and jointly during other operations to engage the totalizer with the actuator, independent means, and connections controlled thereby for establishing an operative relation between said operating connections and either one or both of said camming members.

17. In a machine of the class described, the combination of a plurality of sets of totalizers, the totalizers of each set being mounted in axial alinement, supporting means for the totalizers of each set, actuating means common to all of said sets of totalizers, means for moving the supporting means of one set to engage the selected totalizer of that set with the common actuating means, engaging means associated with the supporting means of each of the other sets, and means common to the engaging means of all sets and carried by the supporting means of said one set for controlling the effectivity of the engaging means of said other sets.

18. In a machine of the class described, the combination of an actuator, a totalizer adapted to be operated thereby, operating connections for engaging the totalizer with the actuator, two camming members to engage the totalizer with the actuator, adjustable means, and connections controlled thereby for establishing an operative relation between said operating connections and one of said camming members.

19. In a machine of the class described, the combination of an actuator, a totalizer adapted to be operated thereby, operating connections for engaging the totalizer with the actuator, two camming members effective jointly to engage the totalizer with the actuator, manipulative means, and connections controlled thereby for establishing an operative relation between said operating connections and one of said camming members.

20. In a machine of the class described, the combination of an actuator, a totalizer adapted to be operated thereby, operating connections for engaging the totalizer with the actuator, two camming members effective jointly during adding operations to engage the totalizer with the actuator, an adjustable element, and connections controlled by the adjustable element when moved out of normal to effect an operative relation between one of said cams and said operating connections, and for establishing an operative relation between said operating connections and both of said camming members when said adjustable element is moved back to normal.

21. In a machine of the class described, the combination of an actuator, a totalizer adapted to be operated thereby, operating connections for engaging the totalizer with the actuator, two camming members to engage the totalizer with the actuator, means operable as a preliminary to an operation of the machine, and connections controlled thereby for establishing an operative relation between said operating connections and one of said camming members.

22. In a machine of the class described, the combination of a totalizer, an actuator therefor operable to actuate the totalizer to enter amounts therein and to reset said totalizer, operating connections for engaging said totalizer with the actuator at different times during the operating stroke of the latter, camming means for actuating said operating connections to engage the totalizer with the actuator during adding operations, a second camming means ineffective during adding operations, and means for causing the second camming means to effect the engaging of the totalizer with the actuator during resetting operations and to render the first-mentioned camming means ineffective.

23. In a machine of the class described, the combination of a totalizer, an actuator therefor operable to actuate the totalizer to enter amounts therein and to reset said totalizer, operating connections for engaging said totalizer with the actuator at different times during the operating stroke of the latter, camming means for actuating said operating connections to engage the totalizer with the actuator during adding operations, a second camming means, and means for rendering the first camming means ineffective and causing the second camming means to effect the engaging of the totalizer with the actuator during resetting operations.

24. In a machine of the class described, the combination of a totalizer, an actuator therefor operable to actuate the totalizer to enter amounts therein and to reset said totalizer, operating connections for engaging said totalizer with the actuator at different times during the operating stroke of the latter, camming means for actuating said operating connections to engage the totalizer with the actuator during adding operations, a second camming means, and means for rendering the first camming means ineffective and causing the second camming means to actuate said operating connections for engaging the totalizer with the actuator during resetting operations.

25. In a machine of the class described, the combination of a totalizer, an actuator therefor operable to actuate the totalizer to enter amounts therein and to reset said totalizer, operating connections for engaging said totalizer with the actuator at different times during the operating stroke of the latter, camming means for actuating said operating connections to engage the totalizer with the actuator during adding operations, a second camming means, and means for disconnecting the first camming means from said operating connections and for connecting the second camming means with said operating connections during resetting operations.

26. In a machine of the class described, the combination of a totalizer, an actuator therefor operable to actuate the totalizer to enter amounts therein and to reset said totalizer, operating connections for engaging said totalizer with the actuator at different times during the operating stroke of the latter, camming means for actuating said operating connections to engage the totalizer with the actuator during adding operations, a second camming means, and means for disconnecting the first camming means from said operating connections and for causing said second camming means to actuate said operating connections for engaging the totalizer with the actuator during resetting operations.

27. In a machine of the class described, the combination of a totalizer, an actuator therefor, camming means for engaging said totalizer with the actuator during adding operations, a second camming means for engaging the totalizer with the actuator during resetting operations, and means causing the cooperation of both of said camming means to effect the engaging of the totalizer with the actuator during reading operations.

28. In a machine of the class described, the combination of a totalizer, an actuator therefor, camming means for engaging said totalizer with the actuator during adding operations, a second camming means for engaging the totalizer with the actuator during resetting operations, and adjustable means for causing the cooperation of both of said camming means to engage the totalizer with the actuator during reading operations.

29. In a machine of the class described, the combination of a totalizer, an actuator therefor, camming means for engaging said totalizer with the actuator during adding operations, a second camming means for engaging the totalizer with the actuator during resetting operations, both of said camming means cooperating to engage the totalizer with the actuator during reading operations, and a differentially adjustable element having a normal position and a plurality of positions of adjustment for determining which one or whether both of said camming means will be effective to engage the totalizer with the actuator depending upon the position in which said element is set.

In testimony whereof I affix my signature.
FREDERICK L. FULLER.

CERTIFICATE OF CORRECTION.

Patent No. 1,725,859.    Granted August 27, 1929, to

FREDERICK L. FULLER.

It is hereby certified that error appears in the printed specification of the above numbered patent requiring correction as follows: Page 3, line 67, for "bars 83 and locking detents" read "detents 83 and locking bars"; page 11, line 49, for the numeral "247" read "347"; page 13, line 64, after the article "the" insert the words "uppermost or"; and that the said Letters Patent should be read with these corrections therein that the same may conform to the record of the case in the Patent Office.

Signed and sealed this 15th day of October, A. D. 1929.

(Seal)

M. J. Moore,
Acting Commissioner of Patents.